United States Patent [19]
Kawakami et al.

[11] Patent Number: 5,251,195
[45] Date of Patent: Oct. 5, 1993

[54] DISC PLAYER WITH SIMPLIFIED LIFTING AND LOWERING MECHANISM

[75] Inventors: Kouichi Kawakami; Masahiro Moriyama, both of Daito; Hiroki Koba, Hirakata; Toshihide Hamaguchi, Higashiosaka, all of Japan

[73] Assignee: Sanyo Electric Co., Ltd., Osaka, Japan

[21] Appl. No.: 677,542

[22] Filed: Mar. 29, 1991

[30] Foreign Application Priority Data

Mar. 30, 1990 [JP] Japan ............................ 2-87141

[51] Int. Cl.$^5$ ............................................. G11B 17/04
[52] U.S. Cl. ................................. 369/75.2; 360/99.07; 369/77.1
[58] Field of Search .................... 369/75.2, 77.1, 77.2, 369/75.1; 360/99.02, 99.03, 99.04, 99.05, 99.06, 99.07

[56] References Cited

U.S. PATENT DOCUMENTS

| | | | |
|---|---|---|---|
| 4,332,023 | 5/1982 | Okamura et al. | 369/177 |
| 4,701,901 | 10/1987 | Imai | 369/77.1 X |
| 4,800,551 | 1/1989 | Norris | 369/77.1 |
| 4,941,140 | 7/1990 | Ono et al. | 369/77.2 X |
| 5,119,357 | 6/1992 | Tsuruta et al. | 369/75.2 |

FOREIGN PATENT DOCUMENTS

| | | |
|---|---|---|
| 0185140 | 6/1986 | European Pat. Off. |
| 0261384 | 3/1988 | European Pat. Off. |
| 0400949 | 12/1990 | European Pat. Off. |
| 3601831A1 | 7/1986 | Fed. Rep. of Germany |
| 2152267A | 7/1985 | United Kingdom |

*Primary Examiner*—Stuart S. Levy
*Assistant Examiner*—Joseph A. Rhoa
*Attorney, Agent, or Firm*—Nikaido, Marmelstein, Murray & Oram

[57] ABSTRACT

A disc player having a tray drive mechanism, a disc clamp mechanism and a pickup assembly which are mounted on a fixed chassis. A spindle motor for drivingly rotating a turntable is coupled to a motor lift mechanism and drivable upward and downward relative to the chassis. The turntable is movable upward from a standby position below a tray in a loading completed position to a disc clamping completed position where the disc can be pressed into contact with a clamp of the disc clamp mechanism. A drive gear mechanism has a plurality of output portions coupled to the tray drive mechanism, the motor lift mechanism, and the pick-up assembly. The drive gear mechanism also has a power transmission change-over device for transmitting the power of a loading motor selectively to are of the clamps mechanism, the tray drive mechanism, and the pick-up assembly.

3 Claims, 24 Drawing Sheets

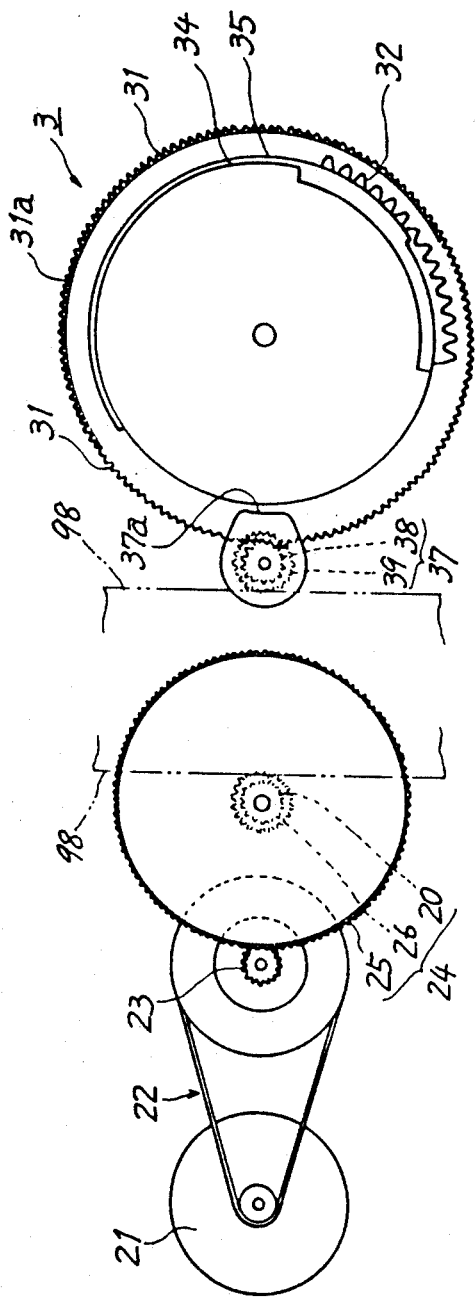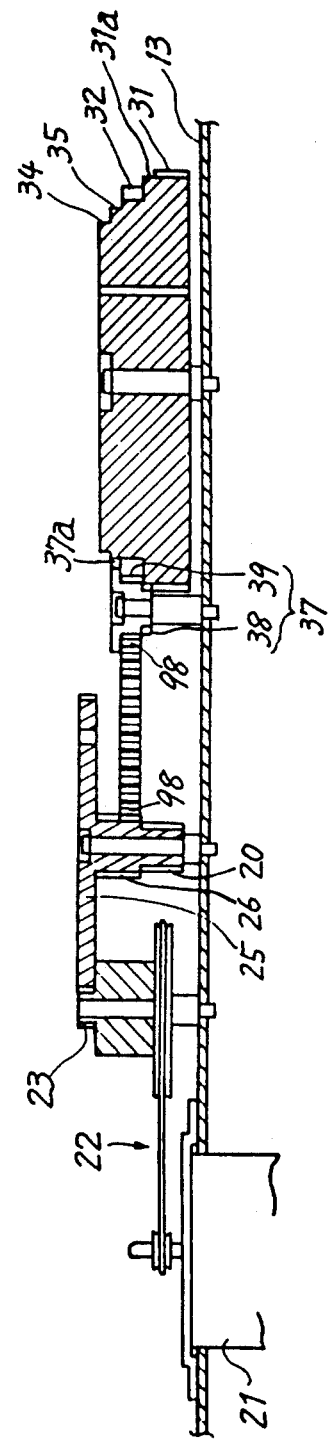
FIG.11(a)
FIG.11(b)

DISC PLAYER WITH SIMPLIFIED LIFTING AND LOWERING MECHANISM

FIELD OF THE INVENTION

The present invention relates a disc player adapted to record signals on or reproduce signals from disclike recording media such as compact discs or laser discs.

BACKGROUND OF THE INVENTION

Disc players are already known in which a disc on a tray is transported horizontally to a position above a turntable, which is then raised to lift the disc off the tray and eventually press the disc against a clamp positioned above the turntable (Unexamined Japanese Patent Publication SHO 61-145758).

The disc player described comprises a main chassis fixedly provided inside a cabinet, and a sub-chassis supported on the main chassis upwardly and downwardly movably and having mounted thereon a turntable assembly, pickup assembly, etc. When the sub-chassis is driven upward by the power of a motor mounted on the main chassis, the turntable rises therewith to lift the disc off the tray.

With the above disc player, however, the sub-chassis carries thereon not only the turntable assembly but also the pickup assembly including a feed motor specific thereto, etc., so that the liftable arrangement including the subchassis is large-sized and heavy. Consequently, the upward and downward movement of the subchassis requires a motor specific thereto and having a great capacity and a large mechanism, and further necessitates a large space since the subchassis is large. This entails the problem of increasing the weight and size of the entire player.

To overcome this problem, it appears useful to mount the pickup assembly on the fixed chassis and to make the turntable assembly only liftable so as to reduce the size and weight of the liftable arrangement.

Nevertheless, another problem is encountered in the case where the pickup assembly is mounted on the fixed chassis. The pickup must be disposed at a level a small distance from the disc on the turntable as raised to its upper limit position, so that if the distance, which is determined by the optical system, is small, the pickup must inevitably be positioned at a higher level than the path of horizontal travel of the tray. The tray or the disc thereon will then collide with the pickup.

Furthermore, the conventional disc player described requires, in addition to a spindle motor for driving the turntable, at least a number of motors, i.e., a motor mounted on the main chassis for driving the subchassis upward and downward, and a pickup transport motor and tray drive motor which are mounted on the sub-chassis. The many motors required entail the problem of not only making the disc player larger and heavier but also necessitating circuits for driving the respective motors to render the electric circuit of the player complex in construction.

SUMMARY OF THE INVENTION

An object of the present invention is to provide a disc player wherein the turntable and the spindle motor only are adapted to be driven upward and downward to render the liftable arrangement small-sized and lightweight and thereby reduce the size and weight of the entire player.

Another object of the invention is to provide a disc player wherein except for the spindle motor for driving the turntable, a single motor is adapted to reciprocatingly drive the tray, to drive the spindle motor upward and downward and to transport the pickup to thereby render the player compact and lightweight and simplify the circuit construction thereof.

Another object of the invention is to provide a pickup assembly for use in disc players wherein the pickup can be retracted to a position free of interference with the tray during tray loading.

The disc player of the present invention comprises a tray drive mechanism, a disc clamp mechanism and a pickup assembly which are mounted on a fixed chassis, and a spindle motor which is coupled to a motor lift mechanism and drivable upward and downward relative to the chassis.

A turntable attached to the output shaft of the spindle motor is upwardly movable from a standby position below a tray in a loading completed position through a central opening of the tray to a disc clamping completed position where the disc can be pressed into contact with a clamp of the disc clamp mechanism.

A drive gear mechanism drivable by a loading motor is provided on the fixed chassis. The drive gear mechanism has a plurality of output portions coupled to the tray drive mechanism, the motor lift mechanism and the pickup assembly, respectively, and a power transmission change-over mechanism for transmitting the power of the loading motor selectively to one of these mechanisms and assembly.

With the disc player described, a disc is placed on the tray in a disc discharge position, and the tray is thereafter transported to the loading completed position by the tray drive mechanism. At this time, the turntable and the spindle motor are in the standby position lower than the level of the tray. After the tray has been completely loaded, the motor lift mechanism starts to operate, raising the turntable from the standby position along with the spindle motor. In this process, the turntable moves through the central opening of the tray while lifting the disc off the tray and presses the disc against the clamp of the disck clamp mechanism by a further upward movement.

In this state, the spindle motor is initiated into operation to drivingly rotate the disc, and the pickup assembly operates to record or reproduce signals.

When the drive gear mechanism drives the tray drive mechanism, the motor lift mechanism and the pickup assembly, the gear mechanism is coupled first to the tray drive mechanism to drive the tray. Next, the drive gear mechanism is coupled to the motor lift mechanism to drive the spindle motor and the turntable upward. The gear mechanism is thereafter coupled to the pickup assembly to transport the pickup.

With the disc player of the present invention, therefore, the liftable arrangement, which does not include the pickup assembly, is smaller in size and weight than in the prior art and movable upward and downward by a simplified mechanism in a smaller space. This serves to render the entire player small-sized and lightweight.

The tray drive mechanism, the motor lift mechanism and the pickup assembly are mounted in common on the chassis, so that the drive gear mechanism for selectively driving them commonly by the loading motor can be realized by a simple construction. This makes the player further smaller and more lightweight and nevertheless renders the circuit construction simpler than conventionally.

The pickup of the pickup assembly included in the disc player of the invention is mounted on a slide base upwardly and downwardly movably.

The slide base is disposed on the chassis and reciprocatingly movable along a radial line of the turntable. The slide base is reciprocatingly driven between a first position opposed to the innermost peripheral portion of the disc on the turntable and a second position opposed to or further outward of the outermost peripheral portion of the disc.

The pickup is supported on the slide base upwardly and downwardly movably. The pickup is driven upward and downward between a retracted position below the path of reciprocating movement of the tray and a raised position close to the tray for recording or reproducing signals.

With the pickup assembly of the disc player, the pickup is set in the retracted position while the tray is being driven from the disc discharge position to the loading completed position. This eliminates the likelihood that the tray or the disc on the tray will collide with the pickup.

With the tray completely loaded in position, the pickup is driven upward from the retracted position to the raised position for recording or reproducing signals, permitting the pickup to be focused on the signal recording surface of the disc.

The slide base is thereafter reciprocatingly driven between the first position and the second position, causing the pickup to record signals on or reproduce signals from the disc on the turntable.

With the pickup assembly of the disc player embodying the invention, the pickup can be held in the retracted position free of interference with the tray during tray loading. Accordingly, even if the focusing range of the pickup is small, collision of the tray or disc with the pickup is avoidable.

BRIEF DESCRIPTION OF THE DRAWINGS

FIGS. 10a, 10b, 11a, and 11b are diagrams of a drive gear mechanism to show the configurations of the gears thereof and the meshing state thereof;

FIGS. 22 (b) and 23 (b) are side elevations corresponding to FIGS. 22 (a) and 23 (a), respectively;

DETAILED DESCRIPTION OF EMBODIMENTS

A detailed description will be given below of a compatible disc player embodying the invention and adapted to reproduce signals from different kinds of discs, such as compact discs or laser discs, which have varying diameters and thicknesses.

Overall Construction

Figure 1:
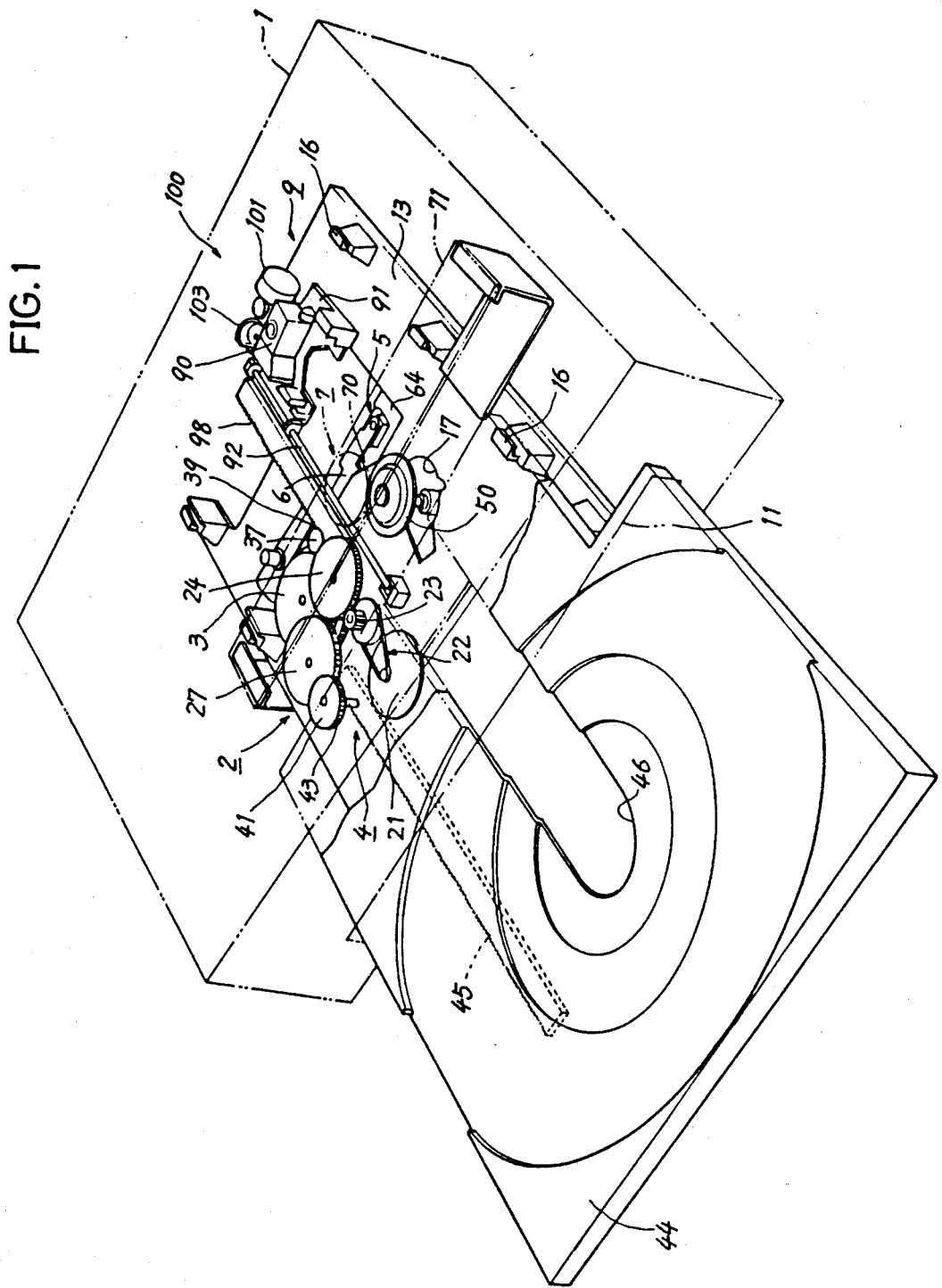
FIG. 1 is a perspective view partly broken away and showing the overall construction of a disc player embodying the invention.

With reference to FIG. 1, a tray 44 is retractably disposed at a front panel opening 11 of a cabinet 1. The tray 44 is reciprocatingly movable by being guided by a plurality of guide support members 16 on a chassis 13 fixedly provided inside the cabinet 1.

Arranged on the chassis 1 inside the cabinet 1 are a tray drive mechanism 4 for reciprocatingly driving the tray 44, a motor lift mechanism 5 for upwardly and downwardly driving a spindle motor 51 along with a turntable 50, a pickup assembly 9 having an optical pickup 90 and a tilting mechanism 100, a drive gear mechanism 2 for driving these mechanisms and assembly, a disc clamp mechanism 7 having a clamp 70, etc. The turntable 50 is liftably mounted on the chassis 13 as will be described later and is positioned as projected upward through a central aperture 17 formed in the chassis 13.

The drive gear mechanism 2 is provided with a loading motor 21 as its power source, transmits power to the tray drive mechanism 4 via a belt transmission mechanism 22, first gear 23, second gear 24, intermediate third gear 3, fourth gear 27 and fifth gear 41, provides output means for the pickup assembly 9 by the second gear 24 and a sixth gear 37 in mesh with the third gear 3, and provides output means for upwardly and downwardly driving the turntable 50 by the third gear 3.

The tray 44 has a portion for supporting different kinds of discs, and this portion is centrally formed with an opening 46 for the turntable 50 to project therethrough.

The construction of the above components will be described below in detail.

Drive Gear Mechanism 2

Figure 10A:
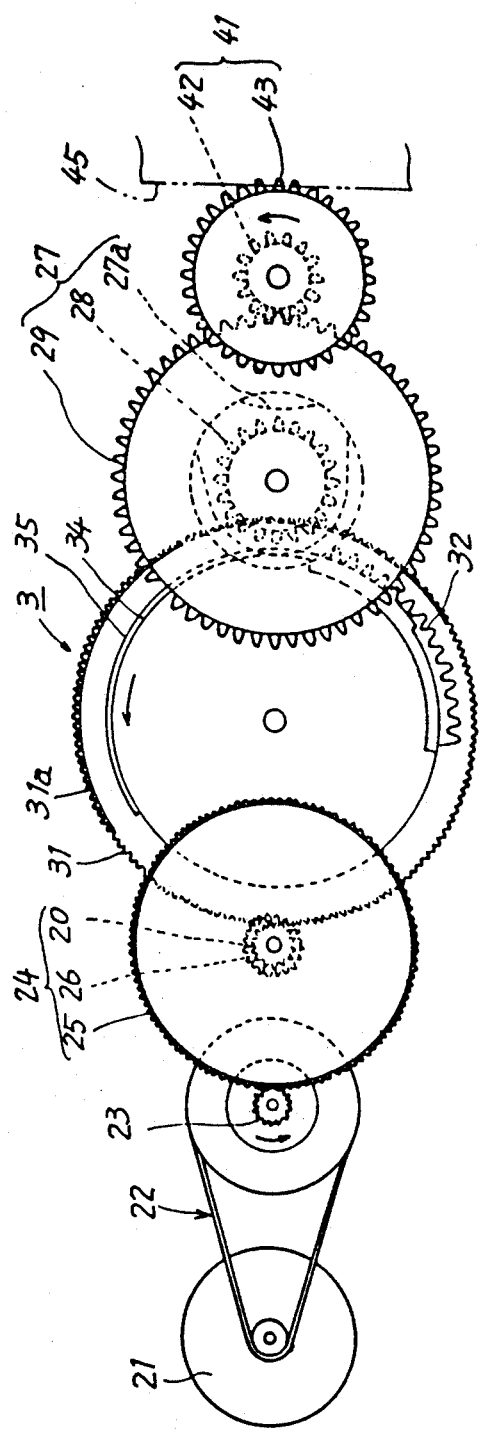
Figure 10B:
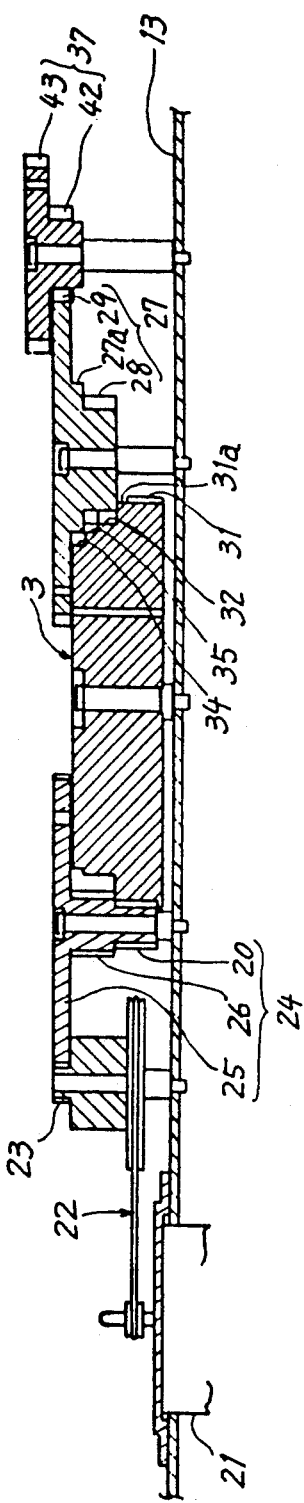

FIGS. 10 (a) and (b) are a plan view and a sectional view, respectively, showing the loading motor 21, belt transmission mechanism 22, and first to fifth gears 23, 24, 3, 27 and 41 constituting the drive gear mechanism 2 and arranged in a row along a route of power transmission to the tray drive mechanism 4. FIGS. 11 (a) and (b) are a plan view and a sectional view, respectively, showing the loading motor 21, belt transmission mechanism 22, second gear 24, third gear 3 and sixth gear 37 as arranged in a row along a route of power transmission to the pickup assembly 9.

These gears each have a multistep structure including different gear portions along the height. The second gear 24 has a large gear portion 25 meshing with the first gear 23 at all times, a pinion portion 26 meshable with a rack 98 constituting the pickup assembly 9, and a small gear portion 20. The third gear 3 has a primary gear portion 31 formed over the entire circumference thereof and meshing with the small gear portion 20 of the second gear 24, and a secondary gear portion 32 formed with teeth only over a predetermined angular range. The primary gear portion 31 has a toothless portion 31a at its upper end approximately over half of its circumference. The fourth gear 27 has a small gear portion 28 meshable with the secondary gear portion 32 of the third gear 3, and a large gear portion 29. The fifth gear 41 has a gear portion 42 always in mesh with the large gear portion 29 of the fourth gear 27, and a pinion portion 43 always in mesh with a rack 45 constituting the tray drive mechanism 4. The sixth gear 37 has a gear portion 38 always in mesh with the primary gear portion 31 of the third gear 3, and a pinion portion 39 always in mesh with the rack 98.

The third gear 3 is provided above the primary gear portion 31 and the secondary gear portion 32 with first and second projecting faces 34, 35 each in the form of a cylindrical surface and extending over a specified angular range. The fourth gear 27 has a recessed face 27a in the form of a cylindrical surface and positioned between the small gear portion 28 and the large gear portion 29. The sixth gear 37 has a recessed face 37a in the form of a cylindrical surface and positioned above the pinion portion 39. The projecting faces 34, 35 of the third gear 3 are engageable with the recessed face 27a of the fourth gear 27 and the recessed face 37a of the sixth gear 37, respectively.

Tray Drive Mechanism 4

With reference to FIG. 1, the rack 45 is attached to the rear side of the tray 44 and extends in the direction of retraction of the tray. The rack 45 is in mesh with the pinion portion 43 of the fifth gear 41.

Accordingly, when the first gear 23 is driven counterclockwise by the loading motor 21 as shown in FIG. 10, the second gear 24 rotates the third gear 3 counterclockwise, bringing the secondary gear portion 32 of the third gear 3 into meshing engagement with the small gear portion 28 of the fourth gear 27, whereby the rotation of the loading motor 21 is further transmitted through the fourth gear 27 to the fifth gear 41, driving the pinion portion 43 of the fifth gear 41 in a direction to load the tray. Consequently, the tray 44 is brought from the disc discharge position shown in FIGS. 1 and 2 into the cabinet as shown in FIG. 3 and is eventually set in the loading completed position shown in FIG. 4. In this state, the front panel opening 11 of the cabinet 1 is closed with the front edge portion of the tray 44.

During the above tray loading process, the turntable 50 is held in its lower limit position as will be described later, and the pickup 90 is set in a low position free of interference with the tray 44 by the operation of the tilting mechanism 100 (see FIGS. 7 and 8).

Figure 2:
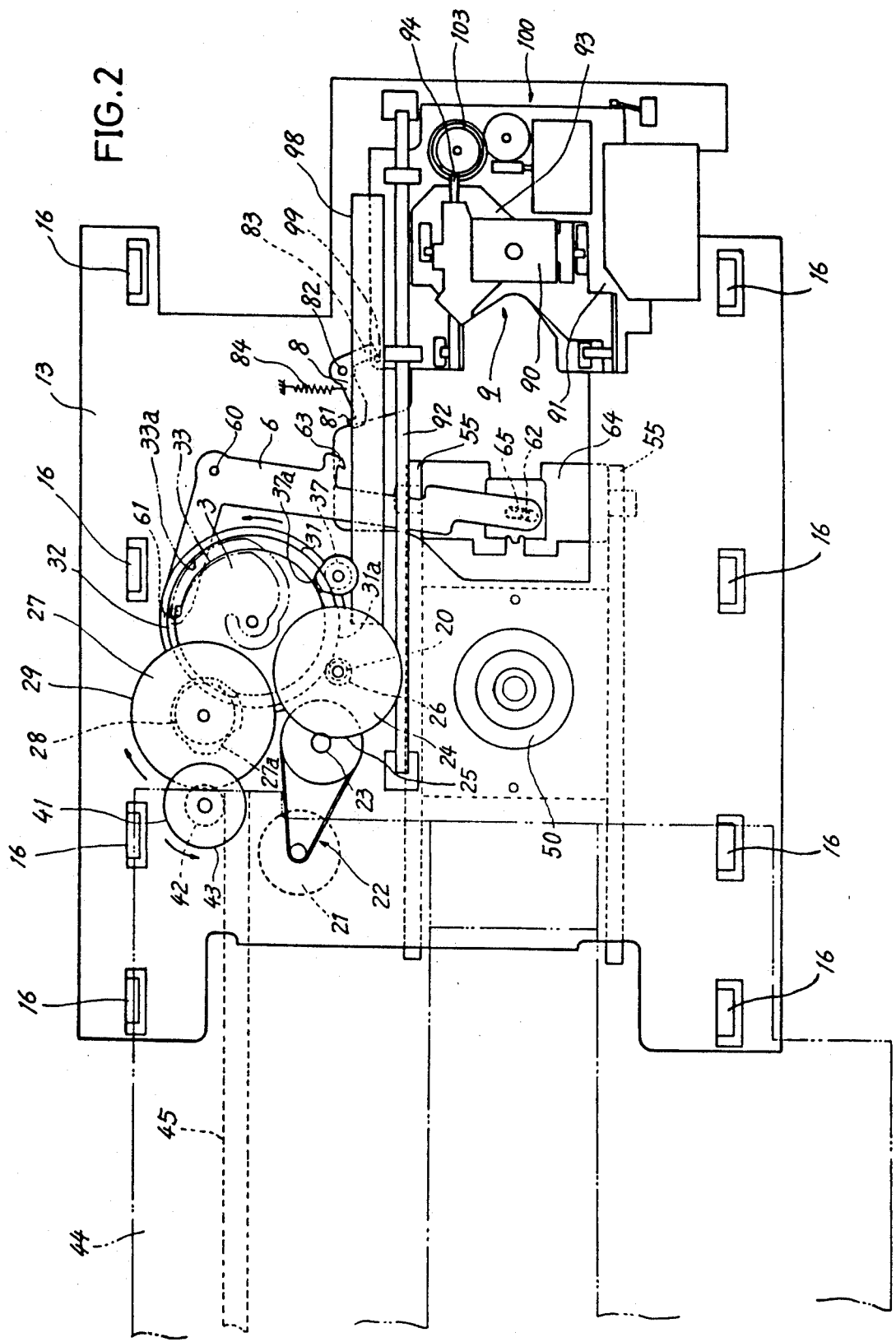
FIGS. 2 to 6 are plan views showing a series of operations to bring the player in condition for signal reproduction after tray ejection.
Figure 3:
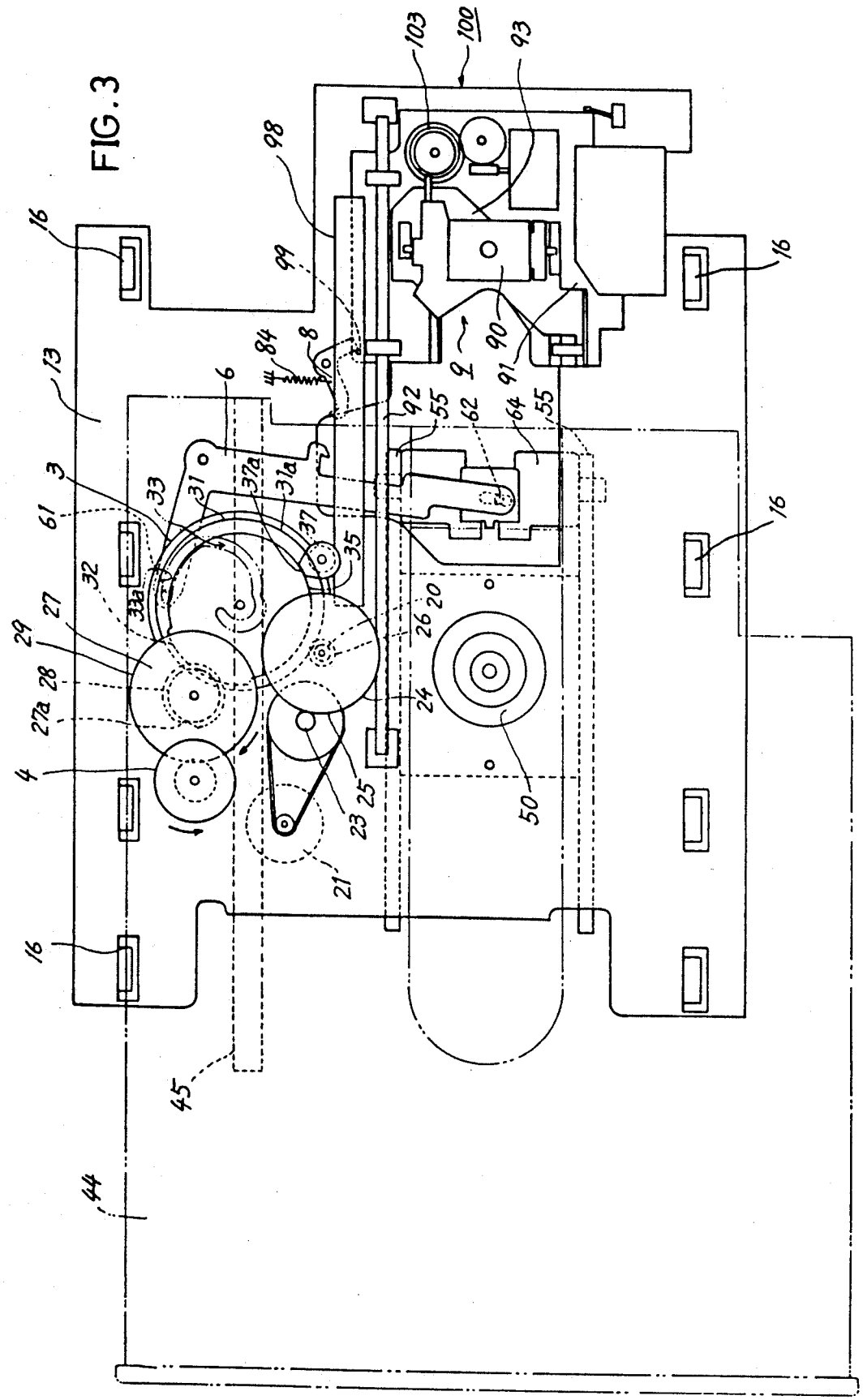
Figure 4:
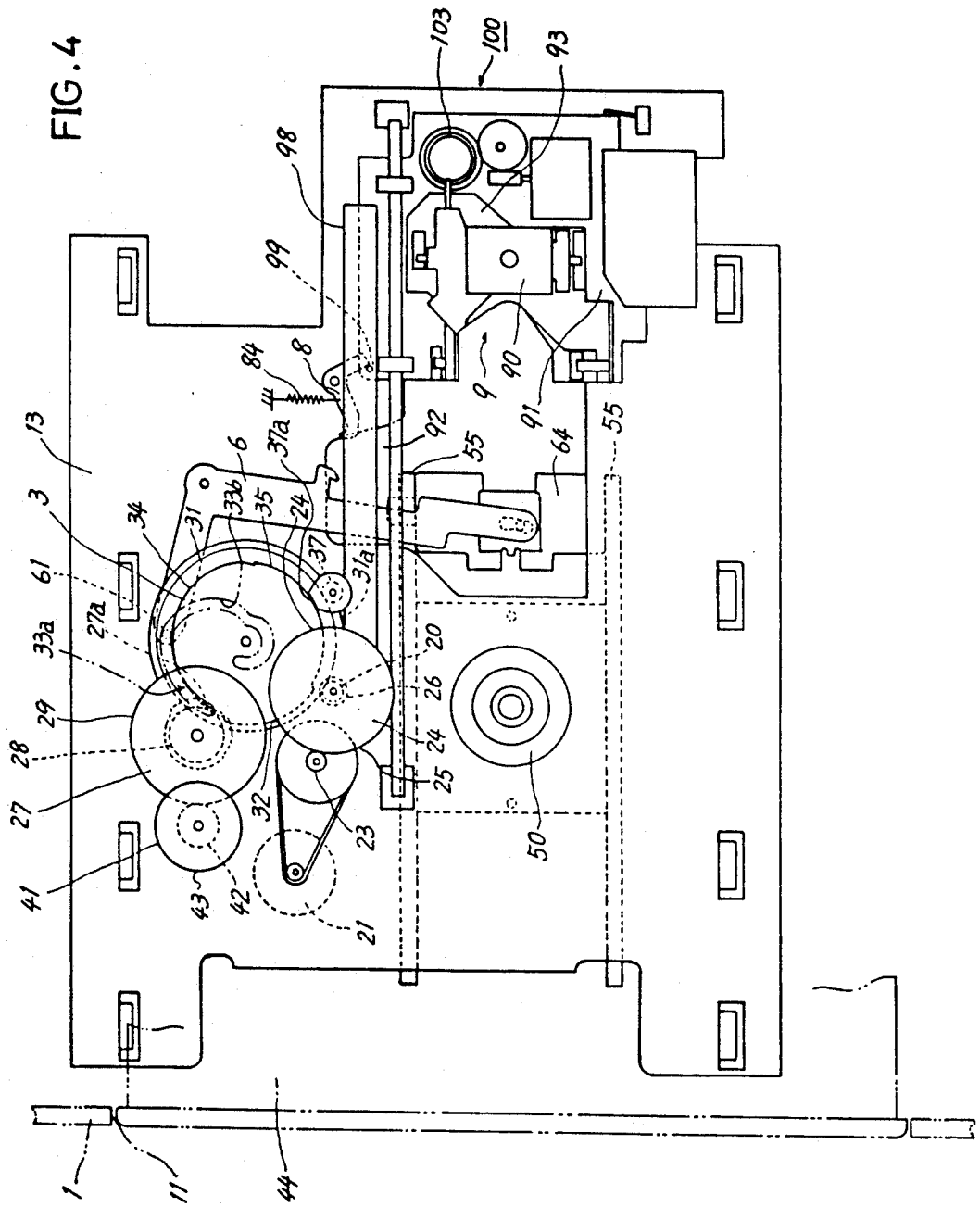

Further during the above process, the pinion portion 26 of the second gear 24 is out of meshing engagement with the rack 98 of the pickup assembly 9 (see FIGS. 2 to 4) and is in idle rotation Further the gear portion 38 of the sixth gear 37 shown in FIG. 11 is opposed to the toothless portion 31a of the primary gear portion 31 of the third gear 3, with the recessed face 37a of the sixth rear 37 in engagement with the second projecting face 35 of the third gear 3 as seen in FIGS. 2 to 4, whereby the sixth gear 37 is locked in a halted state. Consequently, there is no likelihood that the rack 98 of the pickup will be driven in this process.

In the loading completed state shown in FIG. 4, the secondary gear portion 32 of the third gear 3 is out of mesh with the small gear portion 28 of the fourth gear 27, and the first projecting face 34 of the third gear 3 is in engagement with the recessed face 27a of the fourth gear 27, locking the fourth gear 27 in a halted state. Accordingly, the tray 44 is also locked in the loading completed position in this state.

The tray 44 is unloaded by the reverse rotation of the loading motor 21 which rotates the fifth gear 41 clockwise.

Motor Lift Mechanism 5

Figure 12:
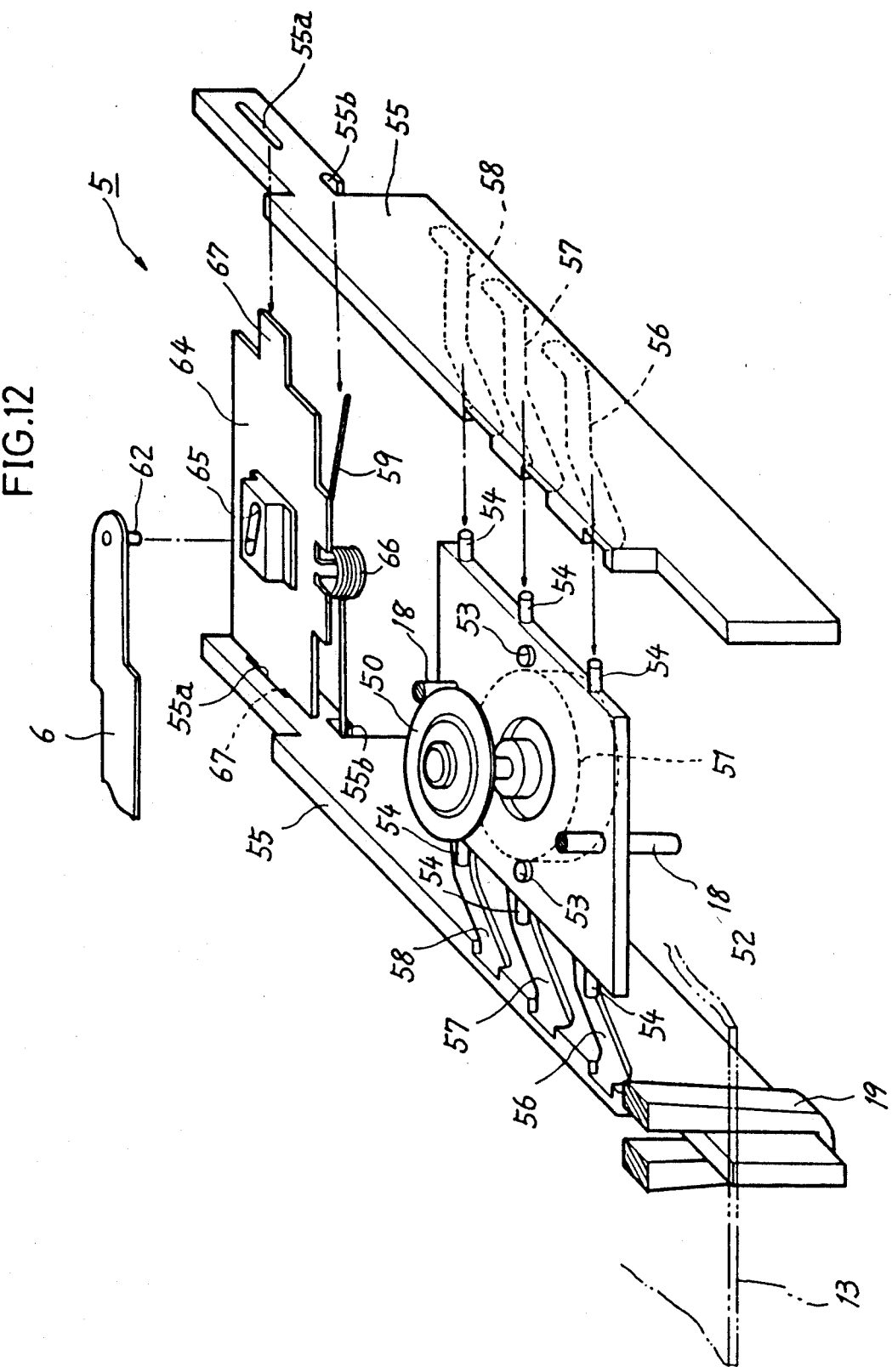
FIG. 12 is an exploded perspective view of the motor lift mechanism.

With reference to FIG. 12, two guide shafts 18, 18 extend downward from the rear side of the chassis 13 for guiding the upward and downward movement of a motor base 52. The spindle motor 51 is mounted on the motor base 52 and has the turntable 50 fixed to its output shaft. A plurality of positioning members 53 are provided on the upper surface of the motor base 52 for determining the upper limit position of the base 52 by contacting with the rear side of the chassis 13. The base has three pins 54 projecting from each of its opposite side faces.

Figure 13:
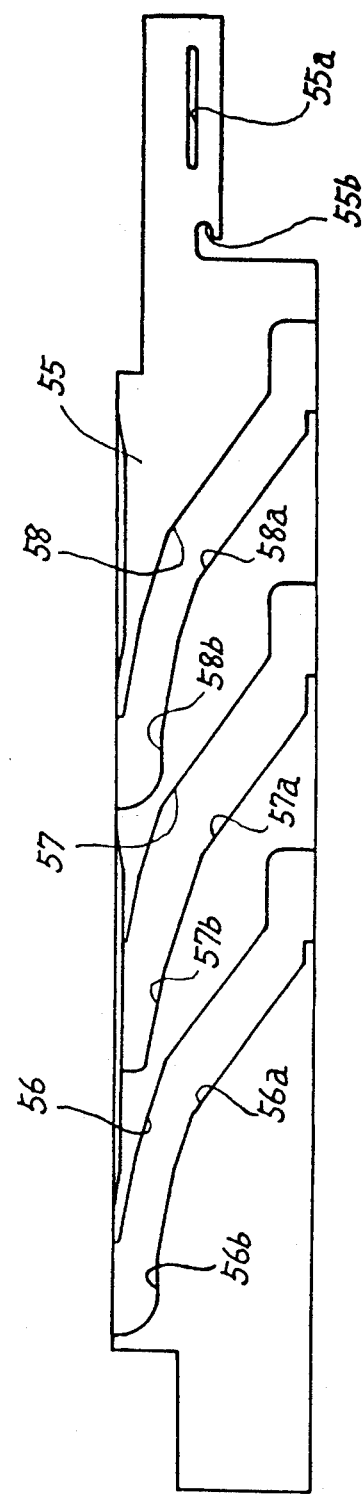
FIG. 13 is a side elevation of a slide drive plate.

Disposed on opposite sides of the motor base 52 is a pair of slide drive plates 55, 55. Each of the plates 55 is supported by a plurality of guide members 19 projecting from the rear side of the chassis 13 so as to be reciprocatingly movable in the direction of ejection or retraction of the tray (see FIGS. 7 to 9). Each slide drive plate 55 is formed in its inner surface with first to third cam grooves 56, 57 and 58 extending obliquely. As seen in FIG. 13, the first cam groove 56 and the third cam groove 58 are identical in configuration and each have a slanting cam portion 56a or 58a and a horizontal cam portion 56b or 58b. On the other hand, the second cam groove 57 has a first slanting cam portion 57a and a second slanting cam portion 57b having a smaller angle of inclination than the first. The rear end of the slide drive plate 55 is formed with a slot 55a and an engaging portion 55b.

As shown in FIG. 12, the pins 54 projecting from each side face of the motor base 52 are engaged in the respective cam grooves 56, 57, 58 of each slide drive plate 55. Thus, a pair of opposed cam mechanisms is provided for moving the motor base 52 upward and downward by the reciprocating movement of the slide drive plates 55.

An intermediate drive plate 64 and a spring 59 are provided between the slide drive plates 55, 55. The intermediate drive plate 64 is provided on its opposite sides with projections 67, 67 loosely fitted in the slots 55a of the respective slide drive plates 55. The spring 59 is retained on a support lug 66 extending downward from the front edge of the intermediate drive plate 64 and has opposite ends engaged with the engaging portions 55b of the respective slide drive plates 55, 55.

The intermediate drive plate 64 has on its upper surface a slotted portion 65 for a pin 62 on a drive lever 6 to engage in.

Accordingly, the intermediate drive plate 64, when moved rearward by the drive lever 6, causes the spring 59 to pull the two slide drive plates 55, 55 rearward, permitting the cam mechanisms to operate to drive the motor base 52 upward.

Figure 7:
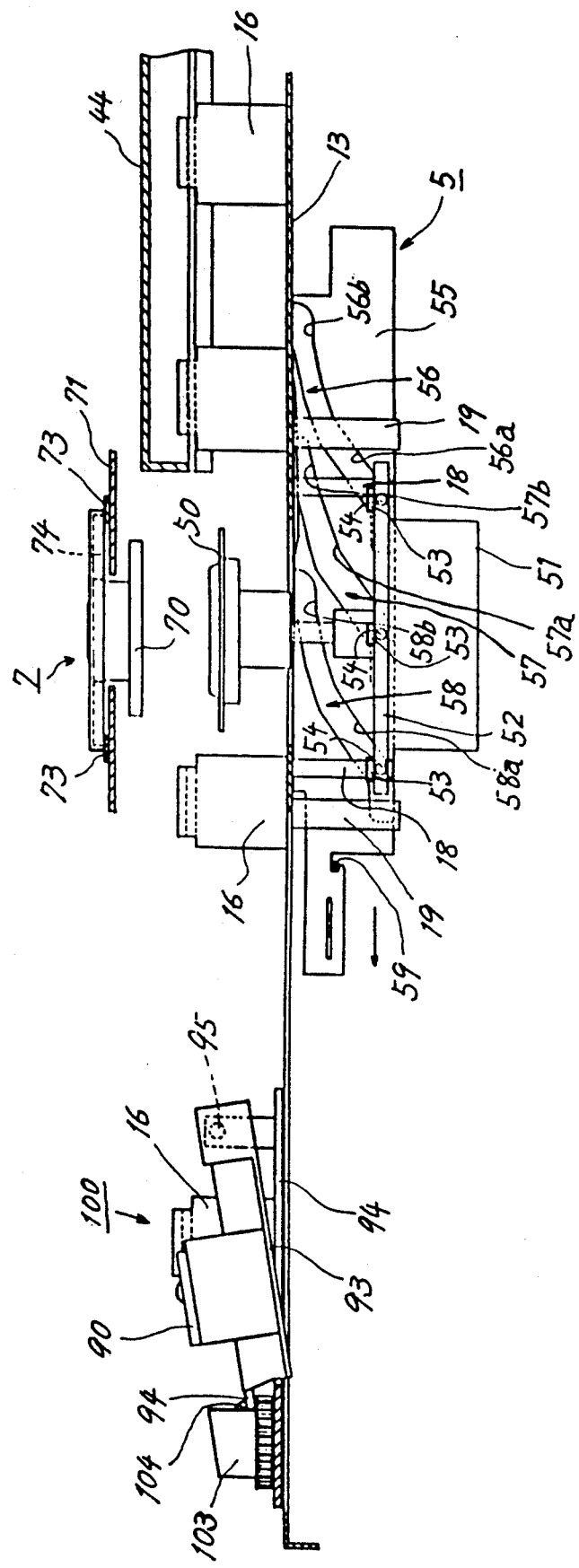
FIGS. 7 to 9 are side elevations partly broken away and showing a motor lift mechanism, disc clamp mechanism and tilting mechanism in a sequential operation.
Figure 8:
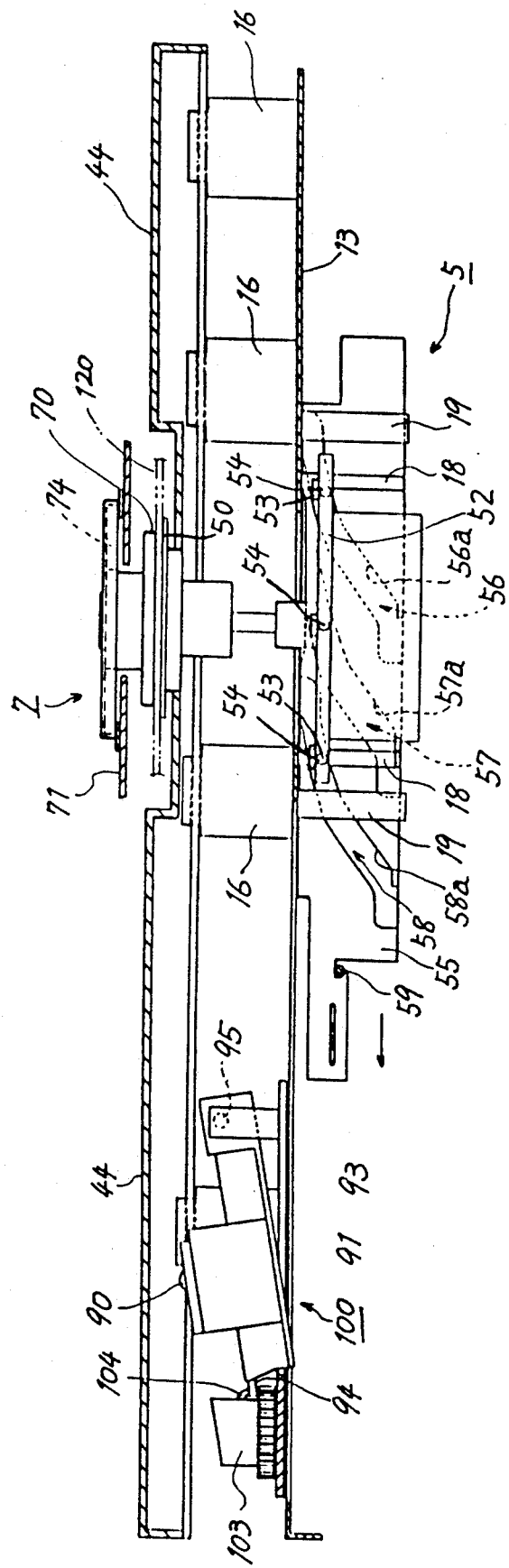
Figure 9:
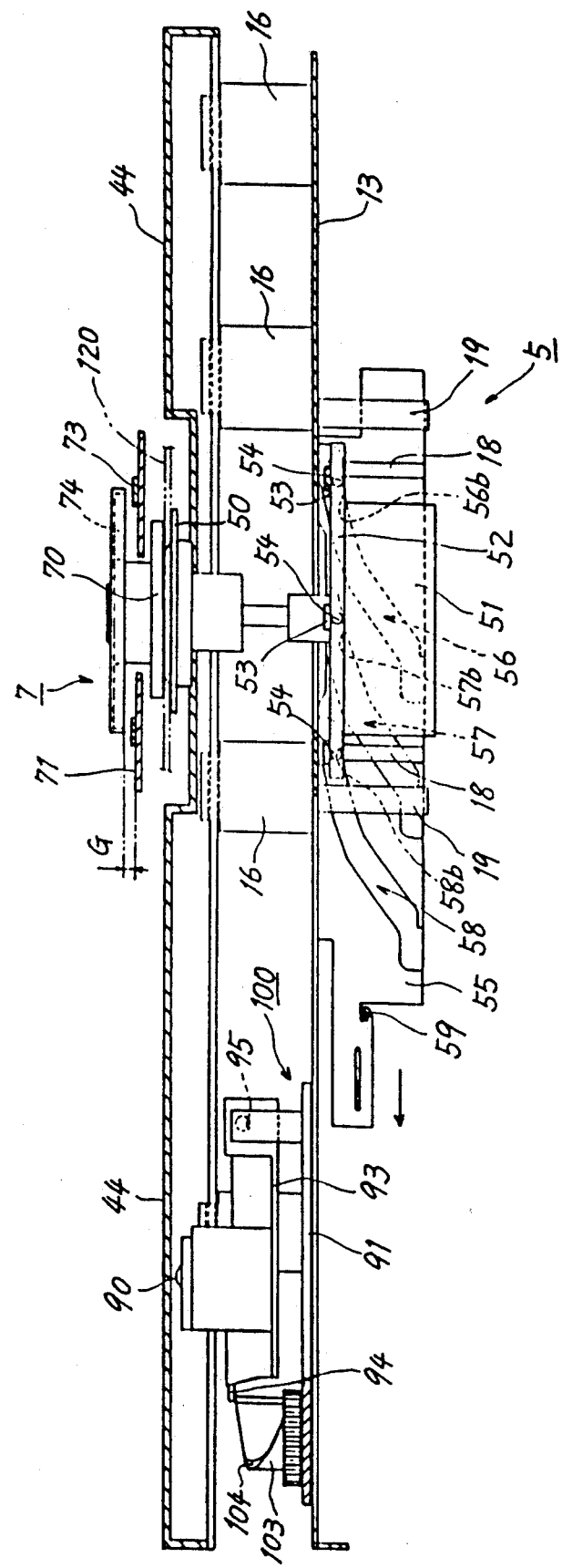

FIGS. 7 to 9 show how the spindle motor 51 is moved upward. While the tray 44 is being loaded, both the slide drive plates 55 are in their foremost advanced position, with the spindle motor 51 and the turntable 50 in a low standby position free of interference with the tray 44 as shown in FIG. 7.

When the spring 59 pulls the slide drive plates 55 rearward (leftward in FIG. 8) upon the tray 44 reaching the loading completed position as shown in FIG. 8, the pins 54 on the motor base 52 are driven by the slanting cam portions 56a, 57a, 58a of the first, second and third cam grooves 56, 57, 58 in the slide drive plates 55, whereby the spindle motor 51 and the turntable 50 are raised along with the motor base 52. In this process, the turntable 50 lifts a disc 120 off the disc supporting portion of the tray 44 into contact with the clamp 70 of the disc clamp mechanism 7.

When the slide drive plates 55 are further pulled leftward, the front and rear two pins 54, 54 on each side of the motor base 52 ride onto the horizontal cam portions 56b, 58b of the first and third cam grooves 56, 58 in each drive plate 55, with each middle pin 54 on the motor base 52 moving onto the second slanting cam portion 57b of the second cam groove 57 of the plate 55 as shown in FIG. 9. In this state, the slide drive plate 55 is slightly pulled further leftward. The second cam portion 57b thus driven presses each positioning member 53 on the motor base 52 into contact with the rear surface of the chassis 13, whereby the turntable 50 is accurately brought to and held in the upper limit position. At this time, the disc 120 on the turntable 50 is properly clamped by the disc clamp mechanism 7 as will be described later.

In the state of FIG. 9, the spring 59 shown in FIG. 12 is elastically deformed, and each projection 67 of the intermediate drive plate 64 is displaced rearward within the range of allowance afforded by the slot 55a of the slide drive plate 55. The resiliency of the spring 59 therefore holds the positioning members 53 on the motor base 52 in pressing contact with the chassis 13.

Next, a mechanism for pivotally moving the drive lever 6 will be described.

With reference to FIGS. 2 to 6, the drive lever 6, which is L-shaped, is movably supported by a pivot 60 on the chassis 13. The lever 6 is provided at one end thereof with a cam follower 61 engaged in a spiral cam groove 33 formed in the rear surface of the third gear 3. The pin 62 on the other lever end is engaged in the slotted portion 65 of the intermediate drive plate 64 as already stated.

Figure 19:
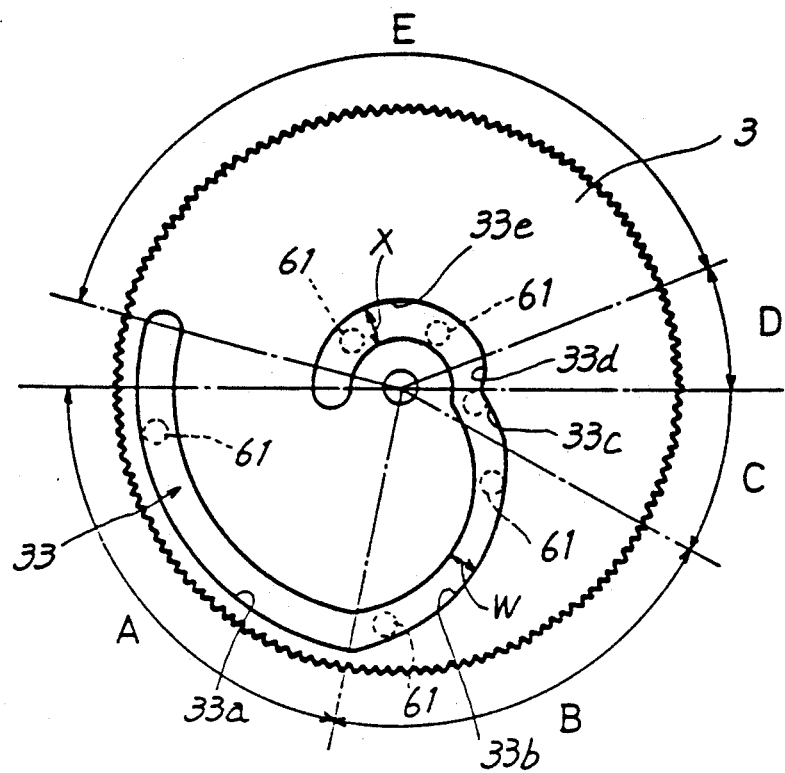
FIG. 19 is a rear view of a third gear.
Figure 20:
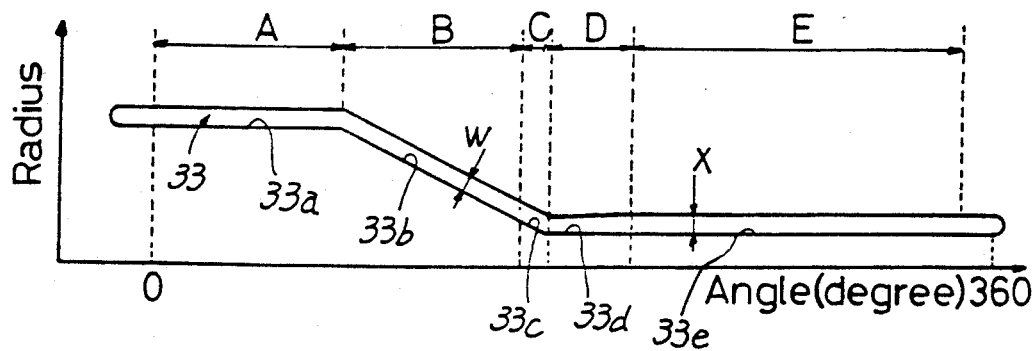
FIG. 20 is a diagram of a cam curve.

With reference to FIGS. 19 and 20, the cam groove 33 of the third gear 3 comprises a first cam portion 33a having a definite radius, second and third cam portions 33b, 33c having a gradually decreasing diameter, a fourth cam portion 33d which is formed by a groove defining outer peripheral wall of increasing radius and which has a groove width increasing from W to X as illustrated, and a fifth cam portion 33e having a definite radius. The cam follower 61 of the drive lever 6 engages in the first cam portion 33a while the tray 44 is being driven, in the second and third cam portions 33b, 33c for driving the motor lift mechanism 5, and in the fifth cam portion 33e during the transport of the pickup 90.

In the tray loading process shown in FIGS. 2 to 4, the cam follower 61 of the drive lever 6 is engaged in the first cam portion 33a of the third gear 3 to hold the drive lever 6 at the limit position of its clockwise movement despite the rotation of the third gear 3. Consequently, the two slide drive plates 55, 55 are set in the forward (leftward in the illustration) limit position of movement to hold the turntable 50 at its lower limit position.

Figure 15:
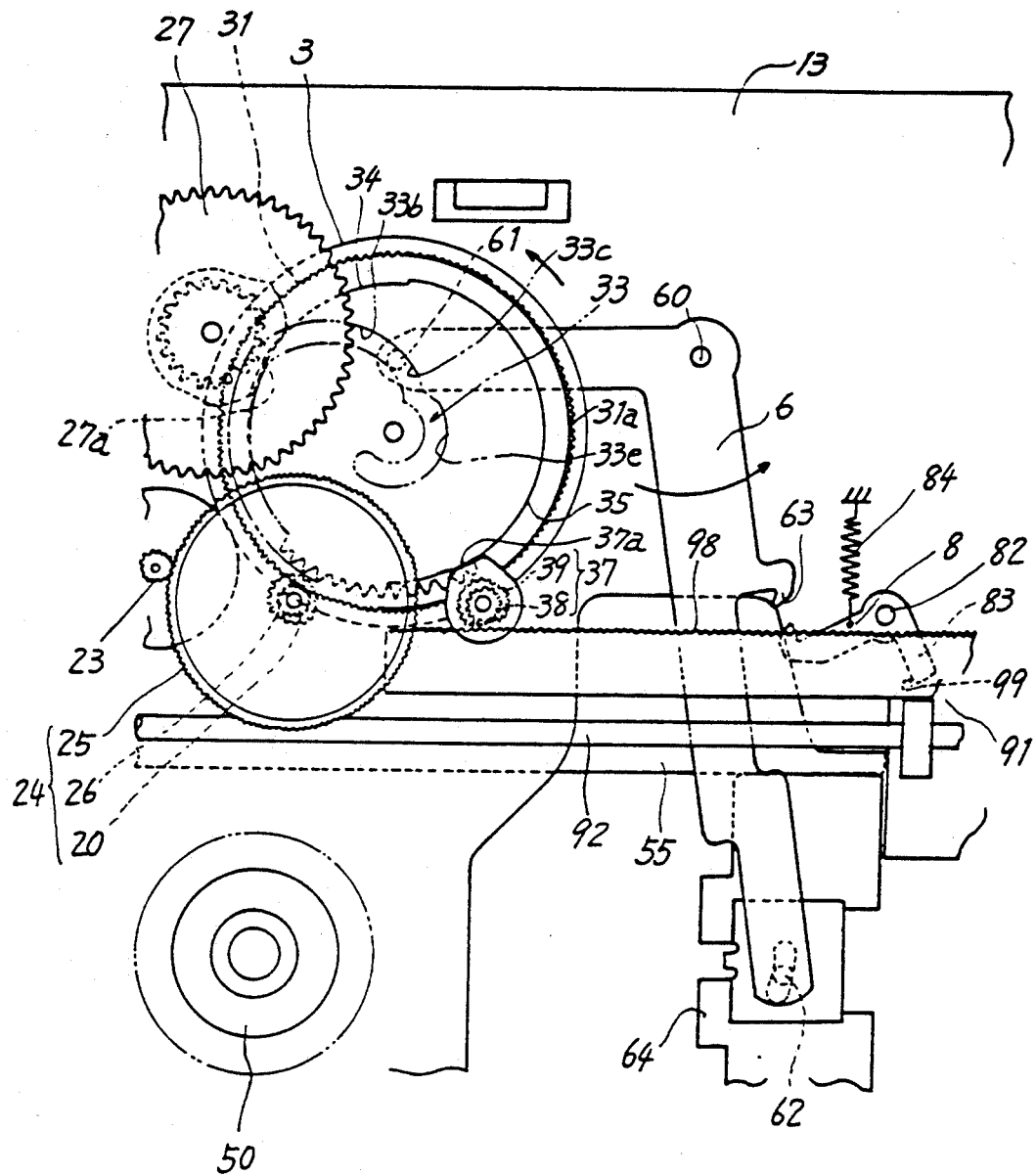
FIGS. 15 to 18 are plan views showing a sequential movement of a drive lever and a side pressure relief lever.

When the third gear 3 is driven further counterclockwise, the cam follower 61 of the drive lever 6 is driven by the second cam portion 33b of the cam groove 33 of the third gear 3 as seen in FIG. 15 to move the drive lever 6 counterclockwise. This movement drives the slide drive plates 55 rearward, raising the turntable from the position of FIG. 7 to the position of FIG. 8 within the range of movement of the second cam portion 33b.

Figure 5:
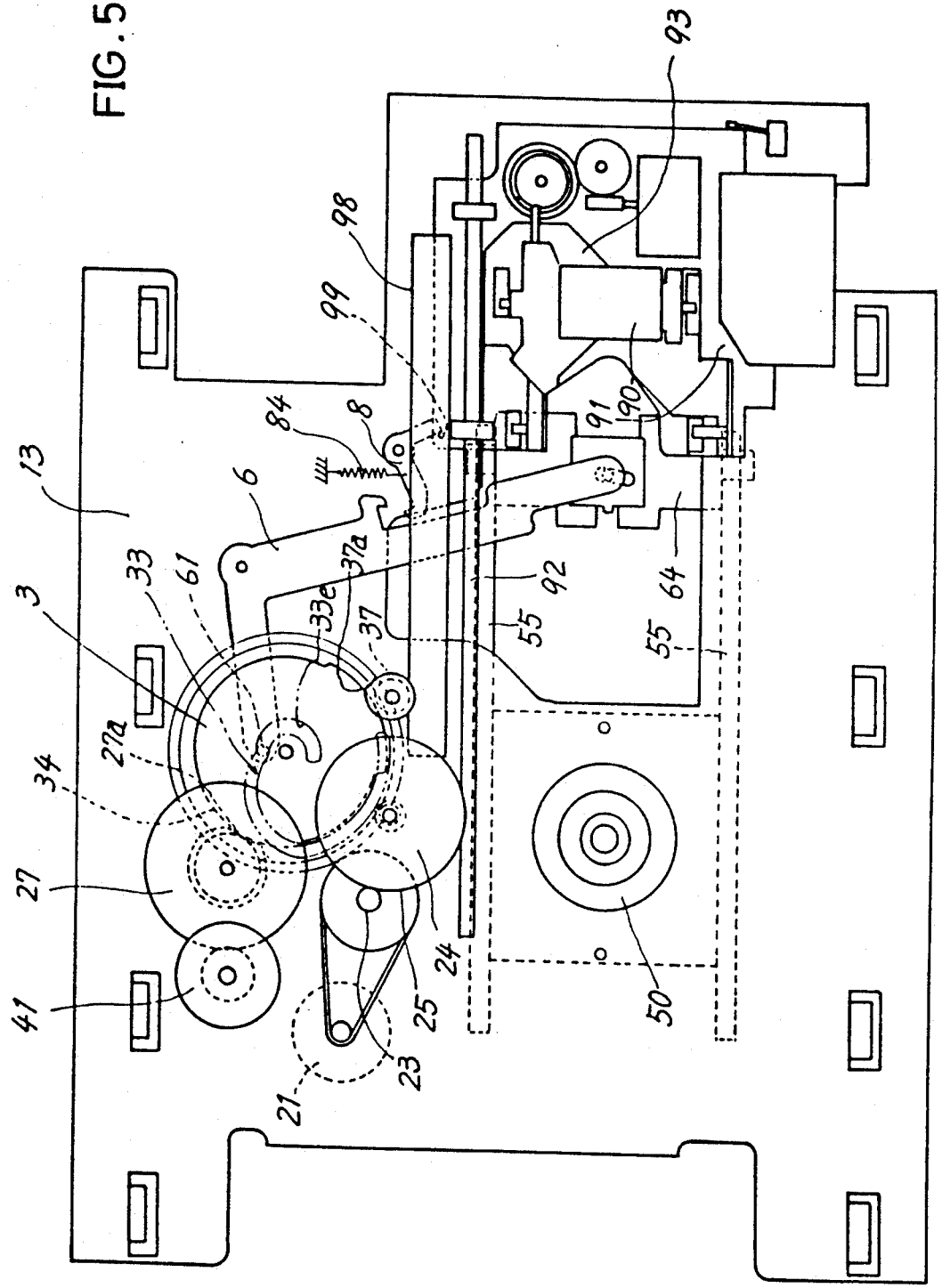

The third gear 3 is driven further counterclockwise, causing the third cam portion 33c of the cam groove 33 to function to bring the intermediate drive plate 64 to the rearward limit position of its movement shown in FIG. 5 and to raise the turntable 50 from the position of FIG. 8 to the position of FIG. 9. The disc is therefore held by the clamp 70.

Disc Clamp Mechanism 7

The disc clamp mechanism 7 gives a clamping force magnetically and is attached to a metal support member 71 secured to the chassis 13 as shown in FIG. 1. The support member 71 serves as a yoke in the form of a flat plate.

Figure 14:
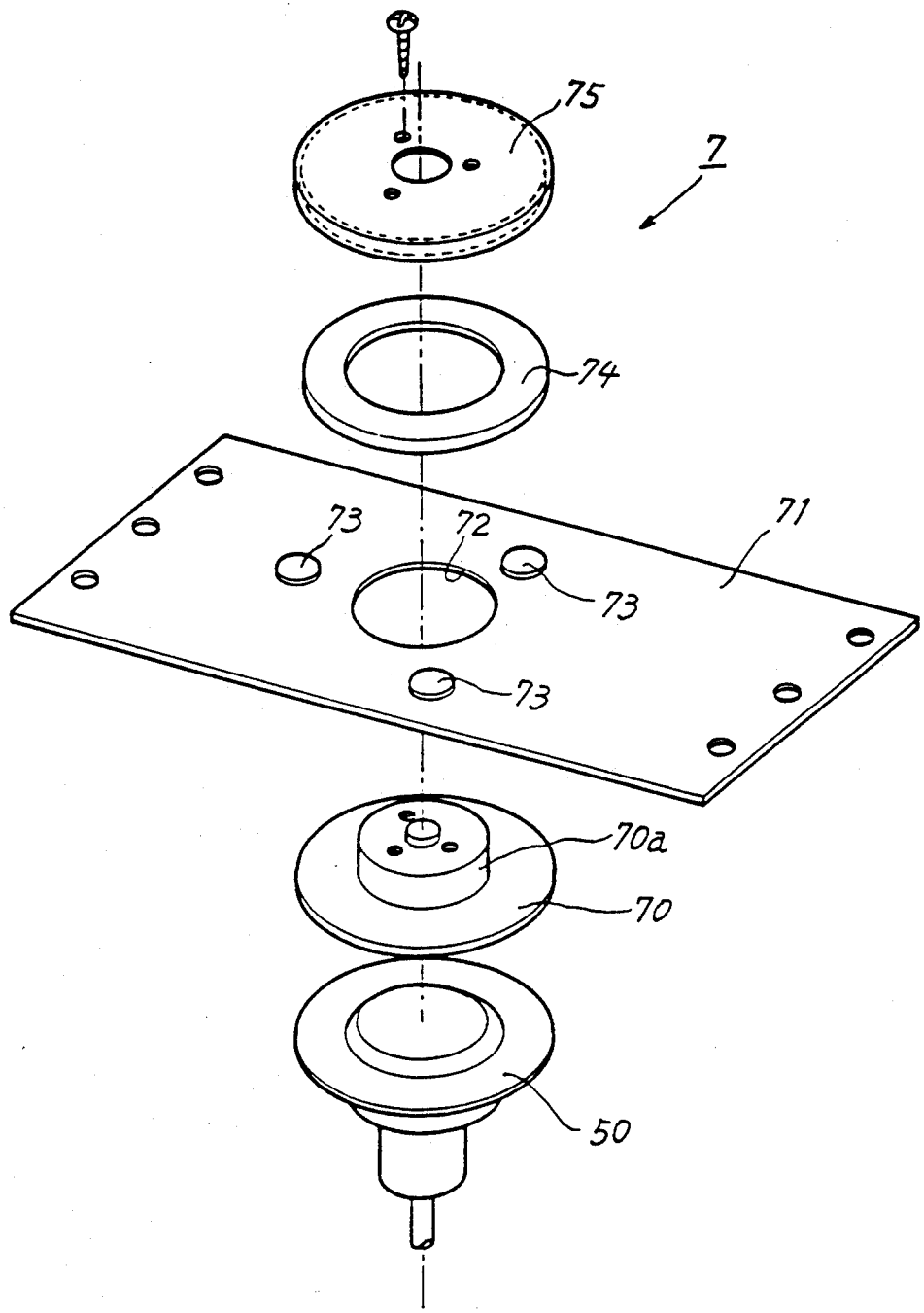
FIG. 14 is an exploded perspective view of the disc clamp mechanism.

With reference to FIG. 14, the disc clamp mechanism 7 comprises the clamp 70 in the form of a disc, an annular permanent magnet 74, and a holder 75 for holding the magnet 74. The magnet 74 fixed to the holder 75 is disposed above the support member 71, and the clamp 70 below the member 71. The holder 75 holding the megnet 74, and the clamp 70 are assembled together. The clamp 70 has a shank 70a extending loosely through a central opening 72 formed in the support member 71. A plurality of seat members 73 for the magnet 74 to rest on are provided on the upper surface of the support member 71.

Accordingly, when the turntable 50 is in the lowered position shown in FIG. 7, the magnet 74 is in intimate contact with the seat members 73 on the support member 71 owing to the magnetic attraction between the magnet 74 and the support member 71 to hold the clamp 70 in a lower limit position away from the support member 71 by the largest distance.

During the rise of the turntable 50 following completed loading, the clamp 70 is pushed up by the disc 120 on the turntable 50 as shown in FIGS. 8 and 9. Upon the turntable reaching an upper limit position, the magnet 74 is raised off the seat members 73 on the support member 71, forming a specified mgangtic gap G between the magnet 74 and the support member 71 as shown in FIG. 9.

Consequently, the magnetic attraction between the magnet 74 and the support member 71 depresses the clamp 70 toward the turntable 50, whereby the disc 120 is held between the turntable 50 and the clamp 70 and completely clamped.

Even when the magnetic gap G somewhat differs owing to variations in the thickness of discs to be clamped, the size of the magnet 74 can be designed as desired, so that the disc clamp mechanism 7 affords a sufficient clamping force for different kinds of discs.

After the reproduction of signals, the third gear 3 is drivingly rotated clockwise to release the disc from the clamp 70 by lowering the turntable 50.

Pickup Assembly 9

With reference to FIG. 1, a guide shaft 92 extending along the direction of ejection or retraction of the tray is supported on the chassis 13 at one side of the turntable 50. A slide base 91 having the pickup 90, etc. mounted thereon has one end positioned toward the drive gear mechanism 2 and slidably in engagement with the guide shaft 92, and the other end slidably resting on the chassis 13, whereby the pickup 90 is made reciprocatingly movable accurately along a radial line of the turntable 50.

The rack 98 is attached to the slide base 91 and extends in the direction of sliding movement thereof. The pinion portion 26 of the second gear 24 and the pinion portion 39 of the sixth gear 37 mesh with the rack 98 to reciprocatingly drive the slide base 91.

Figure 21:
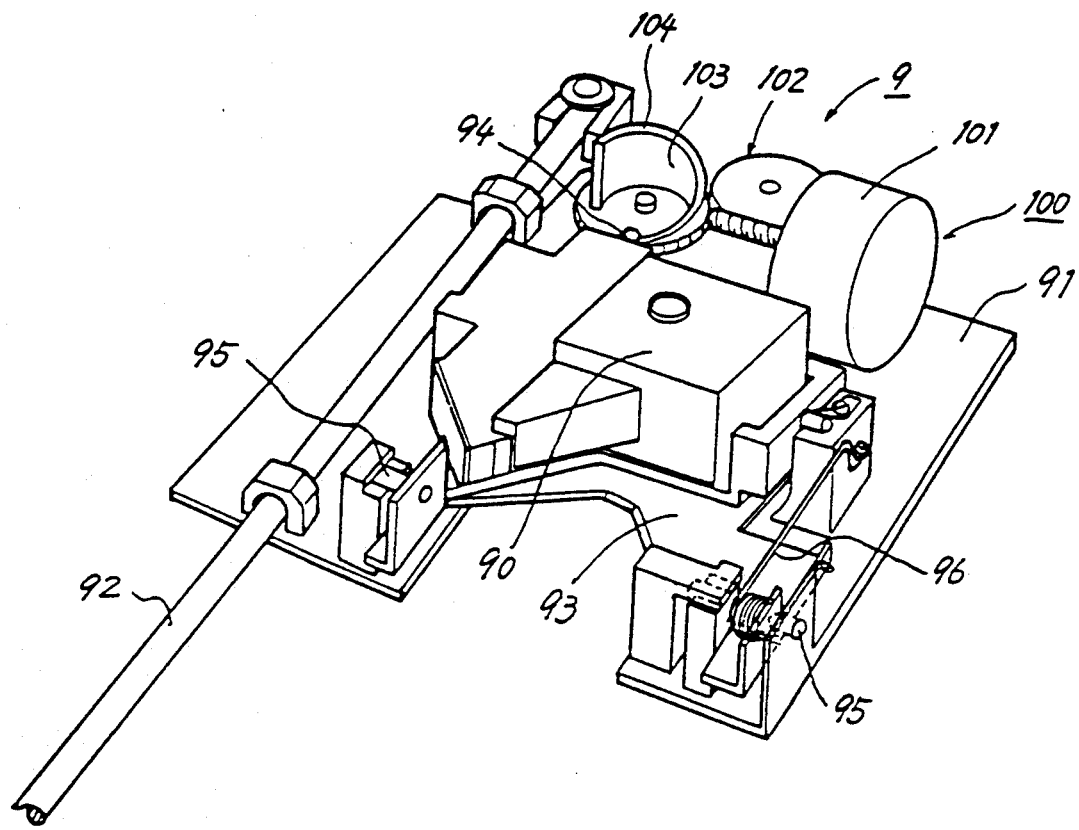
FIG. 21 is a perspective view of a pickup assembly.

With reference to FIG. 21, a pivotal base 93 having the pickup 90 secured directly thereto is mounted on the slide base 91. A pair of pivots 95, 95 projecting outward from opposite sides of the pivotal base 93 is supported on the slide base 91, whereby the pivotal base 93 is supported so as to be movable upward and downward over a predetermined angular range. A spring 96 is provided between the pivotal base 93 and the slide base 91 for biasing the base 93 downward.

The pickup assembly 9 is provided with the tilting mechanism 100 for adjusting the tilt of the optical axis of the pickup 90 for the reproduction of signals. The tilting mechanism 100 serves also as a pickup retracting mechanism for pivotally moving the pickup 90 downward along with the pivotal base 93 to avoid the interference of the pickup 90 with the tray 44 while the tray is being loaded as seen in FIG. 8.

The tilting mechanism 100 comprises, as seen in FIG. 21, a pin 94 projecting rearward from an end portion of the pivotal base 93, a cam member 103 having a helical cam face 104 for the pin 94 to slide on, gear means 102 for drivingly rotating the cam member 103 and a motor 101 serving as a power source for the gear means 102. Accordingly, the pin 94 is caused to slide along the cam face 104 to drive the pivotal base 93 upward or downward by driving the motor 101 and thereby rotating the cam member 103 forward or reversely.

Figure 22A:
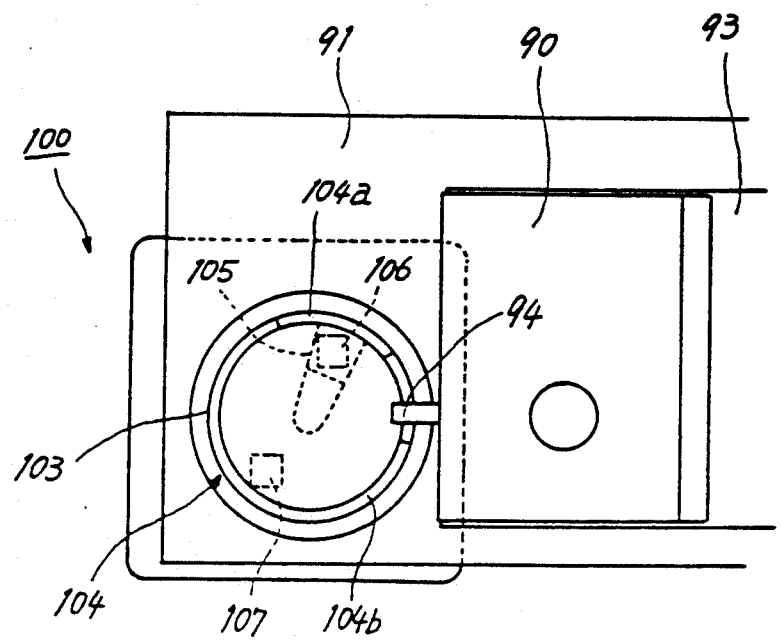
FIGS. 22 (a) and 23 (a) are plan views showing the operation of the tilting mechanism.
Figure 22B:
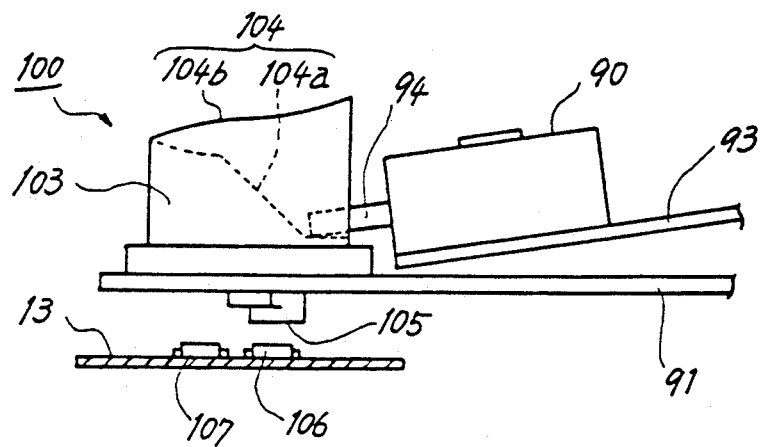
Figure 23A:
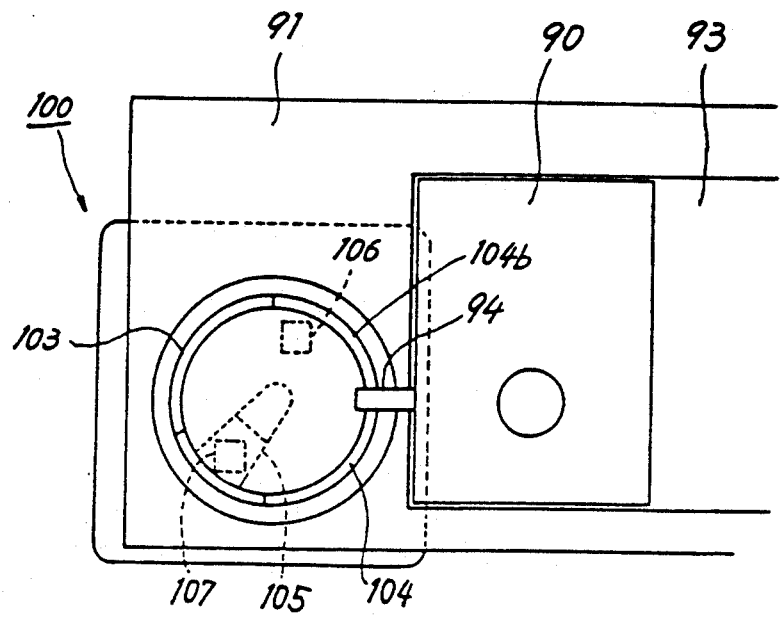
Figure 23B:
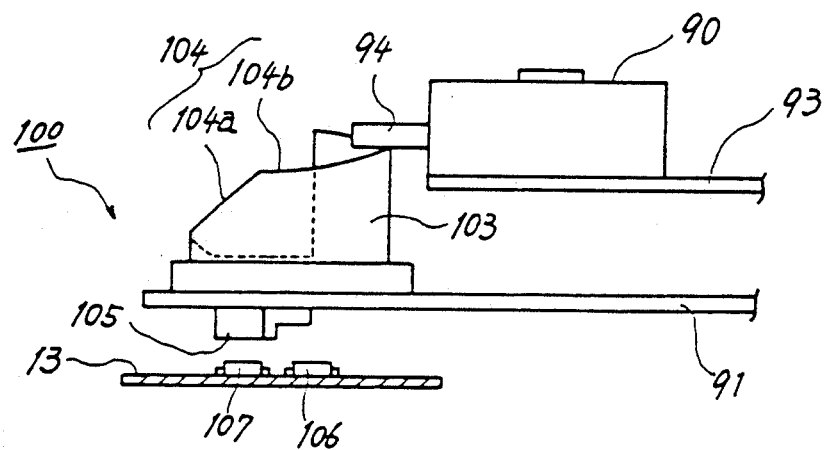

As shown in FIGS. 22 (a), (b) and FIGS. 23 (a), (b), the cam face 104 has a steep first slope 104a and a gentle second slope 104b. The sliding of the pin 94 along the first slope 104a greatly raises the pivotal base 93 in a lower limit position as shown in FIGS. 22 (a), (b). The second slope 104b thereafter functions to bring the pivotal base 93 into a horizontal position as shown in FIGS. 23 (a), (b). During the recording or reproduction of signals to be described later, the second slope 104b performs the contemplated function of adjusting the tilt based on the horizontal position of the base 93 shown in FIGS. 23 (a), (b).

Mounted on the chassis 13 are a first photosensor 106 for detecting the pickup 90 as set in the lower limit position as seen in FIGS. 22 (a), (b), and a second photosensor 107 for detecting the pivotal base 93 as set in the horizontal position. A reflector plate 105 is provided on the rear surface of the slide base 91 for reflecting the light from the photosensors 106, 107.

The angle through which the pivotal base 93 moves from the position of FIG. 22 (b) to the position of FIG. 22 (a) is about 8 degrees. The tilt angle is varied within the range of ±2.5 degrees for adjustment by the contemplated operation of the tilting mechanism.

The tilting mechanism 100 operates to set the pickup 90 in the lower limit position during tray loading as shown in FIGS. 7 and 8 and to upwardly move the pickup 90 to a raised position at a predetermined distance from the disc 120 on the turntable 50 after the completion of loading as seen in FIG. 9.

Accordingly, even if the turntable 50 and the spindle motor 51 only are made liftable as already stated, with the pickup assembly 9 mounted on the chassis 13, the distnace between the disc 120 and the pickup 90 for signal reproduction, i.e., the focal length of the optical system of the pickup 90, can be set to a proper value.

When the disc is unloaded, the pickup 90 is lowered again to avoid the interference of the pickup 90 with the tray 44.

Thus, the pickup 90 is movable upward and downward utilizing the tilting mechanism 100 for adjusting the optical axis of the pickup 90 for reproducing signals. This eliminates the need for a special mechanism for retracting the pickup 90 during tray loading, consequently simplifying the construction of the player.

Pickup Transport Mechanism

Next, a description will be given of a pickup transport mechanism for reciprocatingly transporting the pickup 90 on the slide base 91 by driving the rack 98 shown in FIG. 1.

Figure 16:
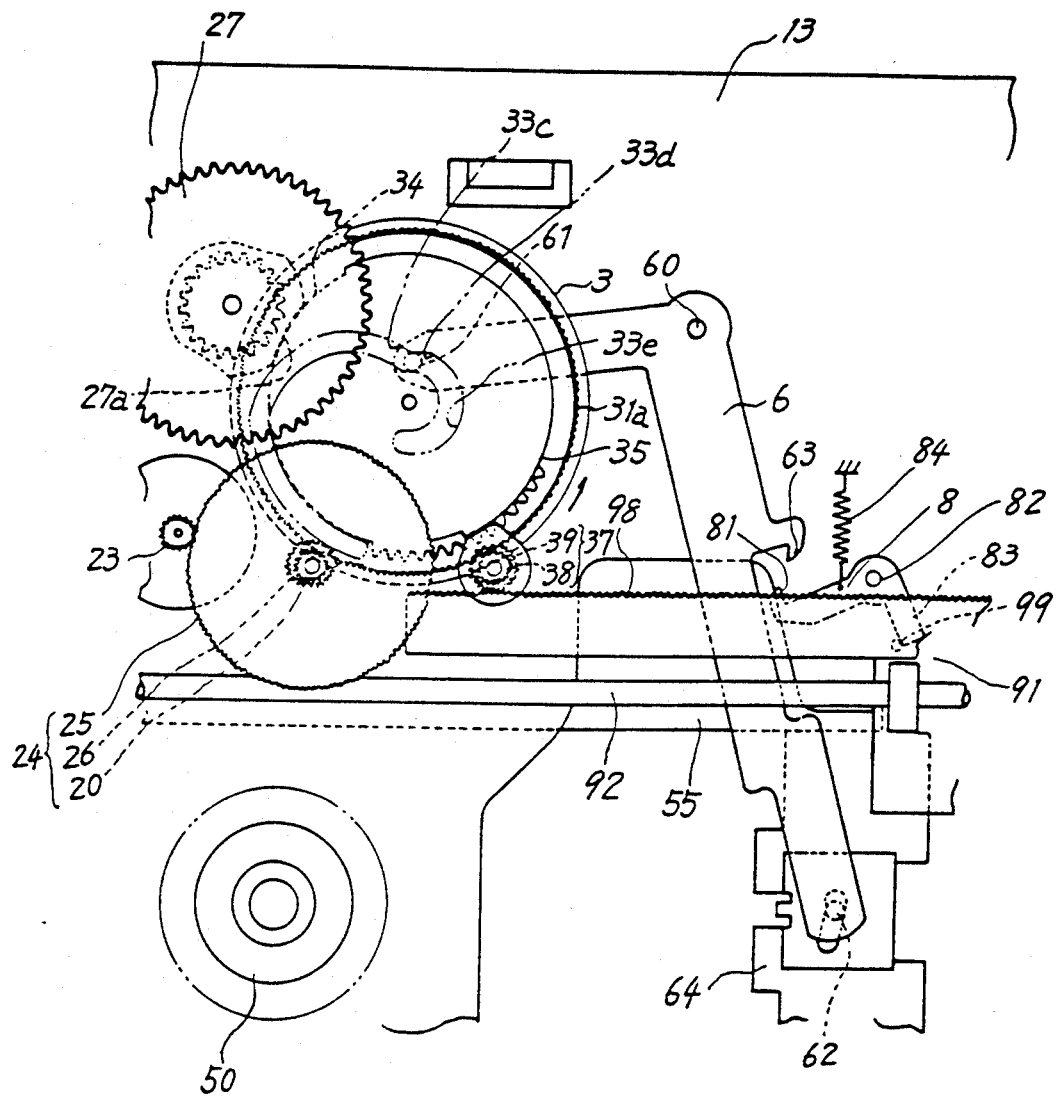
Figure 17:
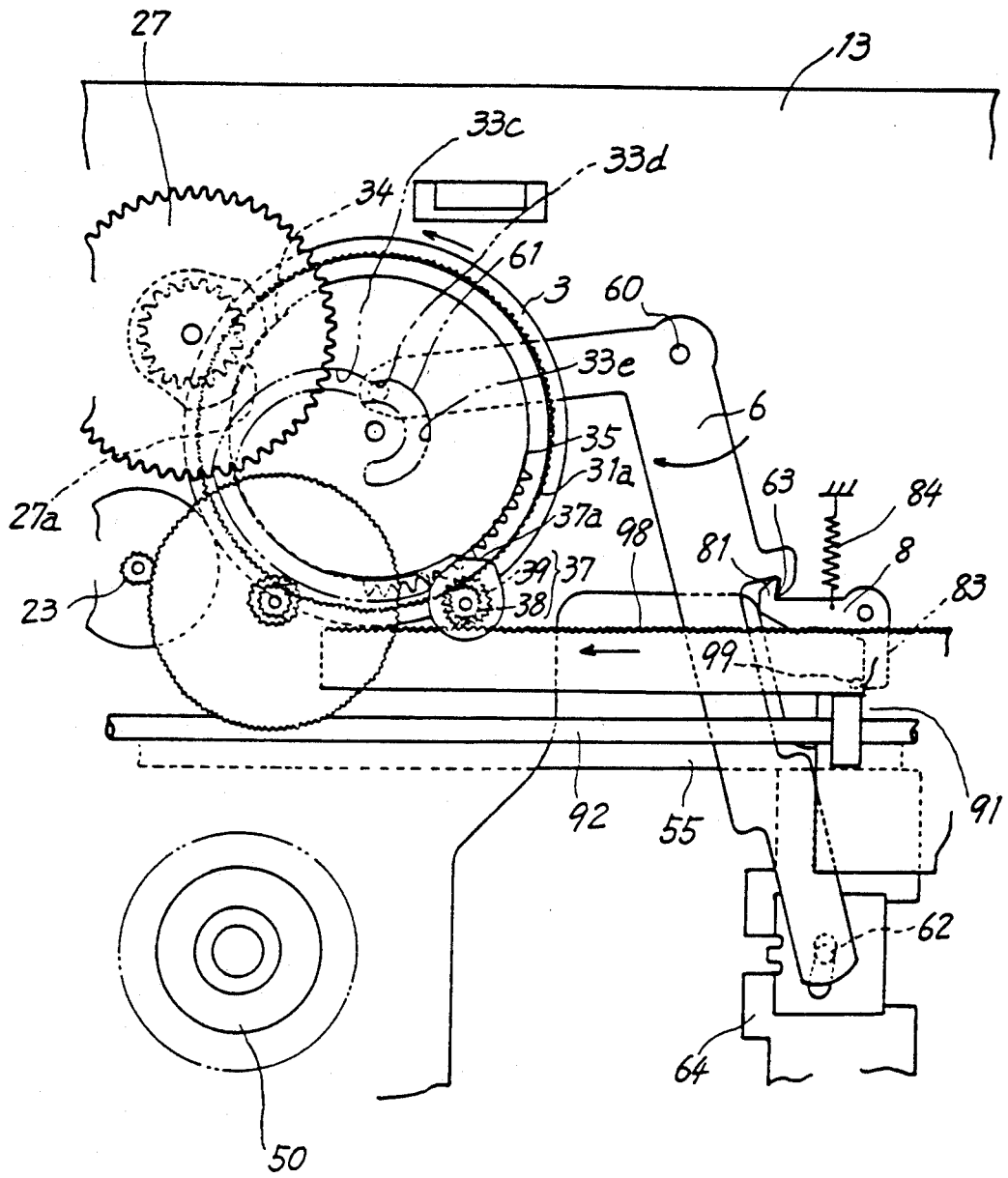

When the third gear 3 is driven further counterclockwise from the disc clamping completed state shown in FIGS. 5 and 16, the toothless portion 31a of the primary gear portion 31 of the third gear 3 is released from the sixth gear 37, and the primary gear portion 31 starts to mesh with the gear portion 38 of the sixth gear as shown in FIG. 17.

Figure 18:
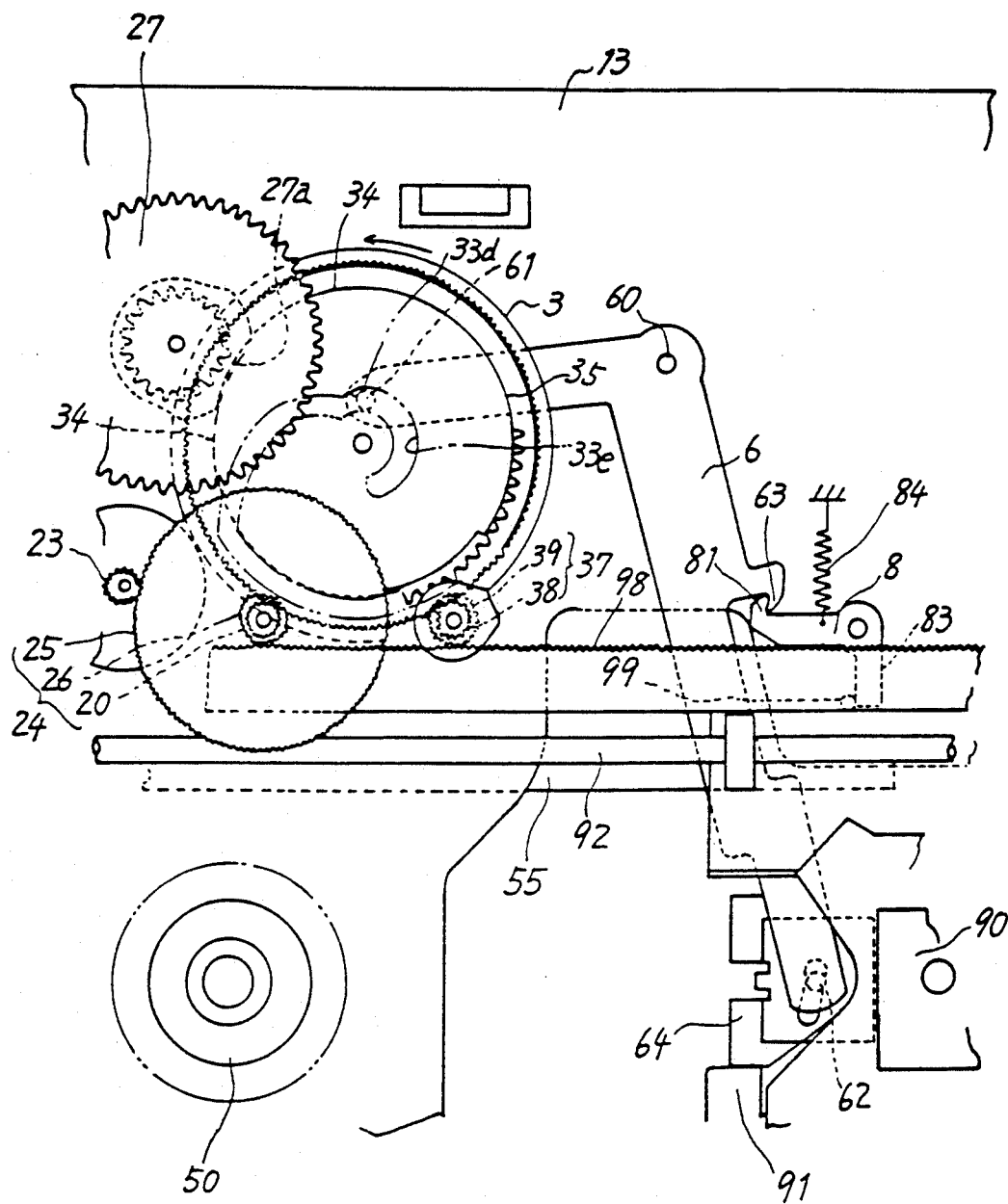

This rotates the sixth gear 37 clockwise, and the pinion portion 39 of the sixth gear 37 starts to drive the rack 98 secured to the slide base 91 leftward as shown in FIG. 17. Consequently, as seen in FIG. 18 and FIG. 11 (a), (b), the rack 98 also meshes with the pinion portion 26 of the second gear 24 simultaneously when meshing with the sixth gear 37. The power of the loading motor 21 is therefore transmitted to the slide base 91 through two routes, that is, via the second gear 24 and the rack 98, i.e., via a first route, and by way of the second gear 24, third gear 3, sixth gear 37 and rack 98, i.e., by way of a second route.

The first route of power transmission includes only two gears, i.e., the first gear 23 and the second gear 24, between the loading motor 21 and the rack 98, and therefore involves a less backlash between the gears than the second route of power transmission. Accordingly, the pickup 90 can be transported under accurate control for signal reproduction.

Side Pressure Relief Mechanism

The pickup assembly 9 is further provided with a side pressure relief mechanism for releasing the cam follower 61 of the drive lever 6 from pressing contact with the wall of the third gear 3 defining the cam groove 33 during the transport of the pickup 90.

The side pressure relief mechanism will be described below.

In the disc clamping completed state shown in FIG. 16, the drive lever 6 is biased to rotate clockwise by the resiliency of the spring 59. The cam follower 61 on the drive lever 6 is therefore pressed into contact with the outer peripheral wall of the third gear 3 defining the cam groove 33, so that if the third gear 3 is driven in this state to transport the pickup 90, the force of friction between the cam follower 61 and the cam groove defining wall acts as a load. Moreover, this load is likely to vary from assembly to assembly. Consequently, the pickup can not be transported under accurate control.

Accordingly, the drive lever 6 is formed with a claw 63, and the chassis 13 has mounted thereon an L-shaped relief lever 8 having a hook 81 engageable with the claw 63. The relief lever 8 has an arm 83 opposite to the hook 81, and is movably supported by a pivot 82 on the chassis 13 and biased clockwise by a spring 84 provided between the lever 8 and the chassis 13. On the other hand, a projection 99 adapted to bear on the arm 83 of the relief lever 8 extends downward from the rear side of the slide base 91 constituting the pickup assembly 9.

In the state shown in FIG. 16 wherein the drive lever 6 is in the limit position of its counter-clockwise movement with the slide base 91 set in the limit position of its righward movement, the projection 99 of the slide base 91 is in pressing contact with the arm 83 of the relief lever 8, holding the relief lever 8 in the limit position of its counterclockwise movement against the spring 84. As a result, the hook 81 of the lever 8 is away from the claw 63 of the drive lever 6.

When the third gear 3 subsequently rotates slightly counterclockwise, causing the sixth gear 37 to move the slide base 91 leftward as seen in FIG. 17, the relief lever 8 rotates clockwise with the movement of the projection 99 to bring the hook 81 of the lever toward the claw 63 of the drive lever 6. The cam follower 61 on the drive lever 6 moves out of engagement with the third cam portion 33c of the cam groove 33 shown in FIG. 19 into engagement with the fourth cam portion 33d thereof. Since the groove width of the fourth cam portion 33d increases from W to X outward, the movement of the cam follower 61 along the groove defining wall of the cam portion slightly rotates the drive lever 6 from the position of FIG. 16 to the position of FIG. 17 clockwise. Consequently, the claw 63 of the drive lever 6 and the hook 81 of the relief lever 8 are almost brought into engagement with each other as seen in FIG. 17.

The third gear 3 thereafter rotates further counterclockwise, moving the slide base 91 leftward. This permits the relief lever 8 to rotate further clockwise, whereby the hook 81 of the lever 8 is completely engaged with the claw 63 of the drive lever 6 as shown in FIG. 18. The relief lever 8 thus engaged acts against the clockwise biasing force exerted on the drive lever 6 by the spring 59 to halt the drive lever 6, no longer allowing the lever 6 to rotate clockwise.

Simultaneously with this, the cam follower 61 of the drive lever 6 moves out of the fourth cam portion 33d of the cam groove 33 shown in FIG. 19 into the fifth cam portion 33e thereof having a larger groove width. This movement brings the cam follower 61 out of contact with the outer peripheral wall defining the cam groove 33, with the result that the groove defining wall is relieved of the side pressure exerted by the cam follower 61. Consequently, the third gear 3 drives the second gear 24 and the sixth gear 37 without being subjected to the resistance offered by the cam follower 61 of the drive lever 6.

Figure 6:
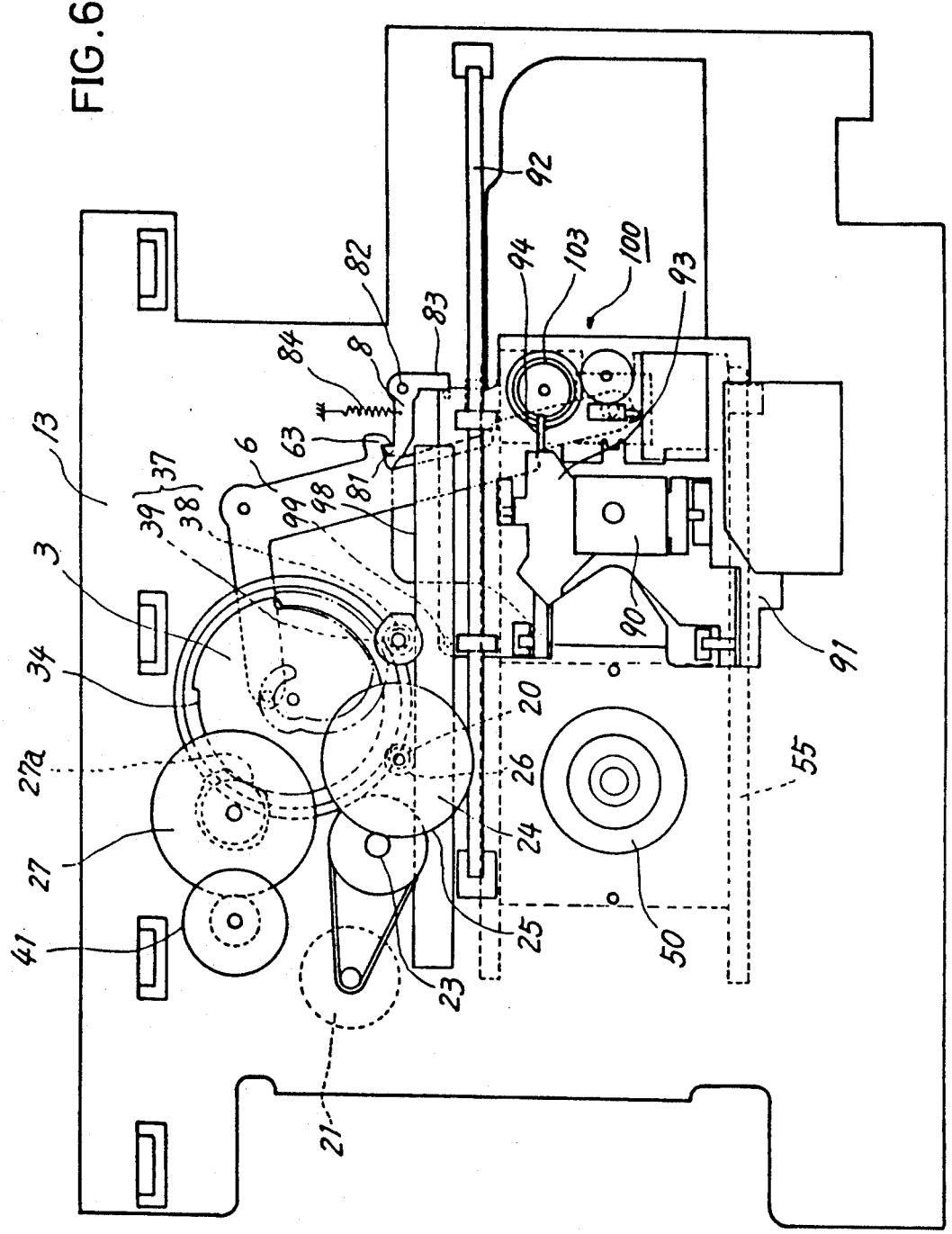

With reference to FIG. 6, during the reciprocating transport of the pickup 90 between the outer periphery of the disc and the inner periphery thereof, i.e., during signal reproduction, the drive lever 6 is held locked in the state of exerting no side pressure on the third gear 3 without rotation, and the cam follower 61 on the lever 6 moves inside the fifth cam portion 33e of FIG. 19 relative thereto free of contact with the inner and outer peripheral walls defining the cam groove 33.

After the reproduction of signals, the claw 63 of the drive lever 6 is released from engagement with the hook 81 of the relief lever 8 by driving the third gear 3 clockwise to move the slide base 91 toward the limit position of its movement outwardly of the disc and thereby cause the projection 99 of the slide base 91 to rotate the relief lever 8 counterclockwise while slightly rotating the drive lever 6 counterclockwise by the movement of the fourth cam portion 33d of the cam groove 33 in the third gear 3 (see FIG. 17).

The side pressure relief mechanism provided serves to maintain the load involved in the transport of the pickup 90 at a constant value to realize the transport under stabilized control.

Support Structure for Chassis 13

Figure 24:
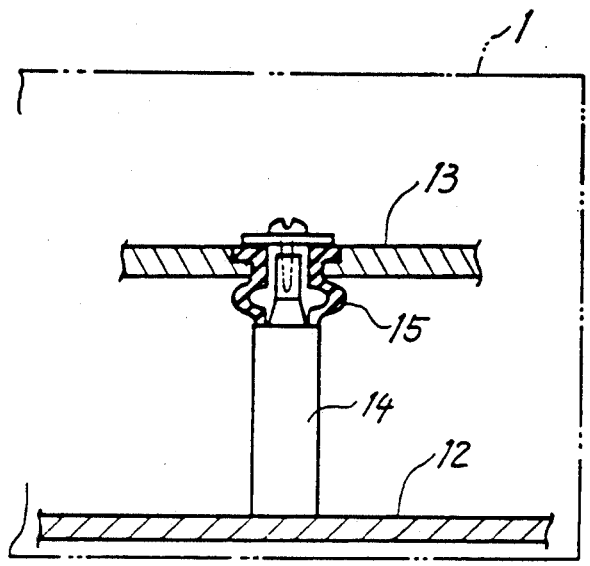
FIG. 24 is a side elevation partly broken away and showing an elastic support structure for a chassis.

With reference to FIG. 24, the chassis 13 is supported by a plurality of posts 14 extending upward from a base 12 on the bottom of the cabinet 1. A cushion member 15 made of rubber or like elastic material is interposed between the chassis 13 and the head of each post 14.

Accordingly, even if the base 12 is subjected to an oscillating or vibrating force due to the operation of some of the components, the force is absorbed by the cushion members 15, precluding the vibration that would cause trouble to the reproduction of signals by the pickup 90.

The vibration inhibitory structure is realized by the arrangement wherein the drive gear mechanism 2, tray drive mechanism 4, disc clamp mechanism 7, pickup assembly 9, etc. are all mounted on the fixed chassis 13.

Motor-Clamp Assembly 110

According to the embodiment described, the turntable 50 is mounted on the output shaft of the spindle motor 51 as seen in FIG. 12 to provide a unitary motor-turntable assembly, whereas it is possible to mount the turntable 50 only on the base 52 and to incorporate the disc rotating spindle motor into the disc clamp mechanism 7 shown in FIG. 14.

Figure 25:
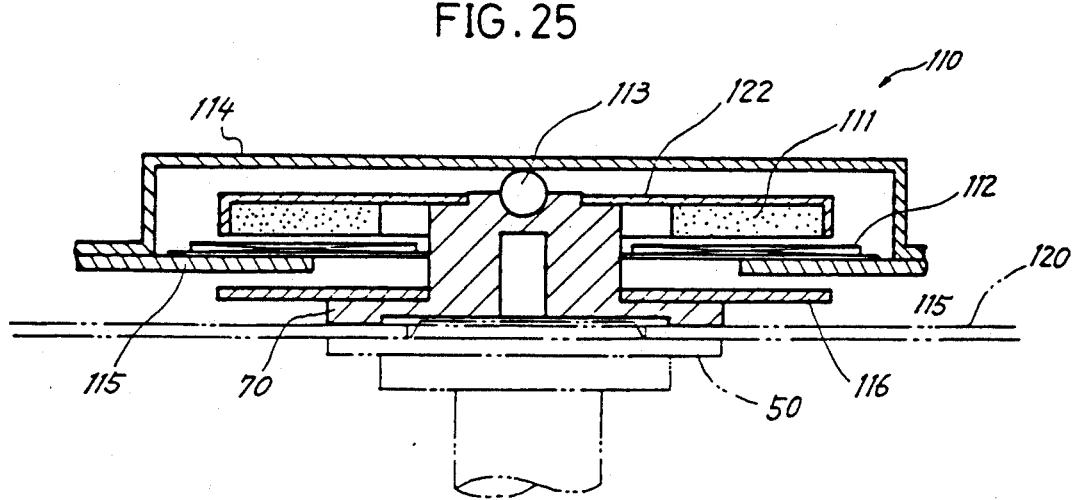
FIGS. 25 to 27 are sectional views schematically showing the construction of unitary motor-clamp assemblies.
Figure 26:
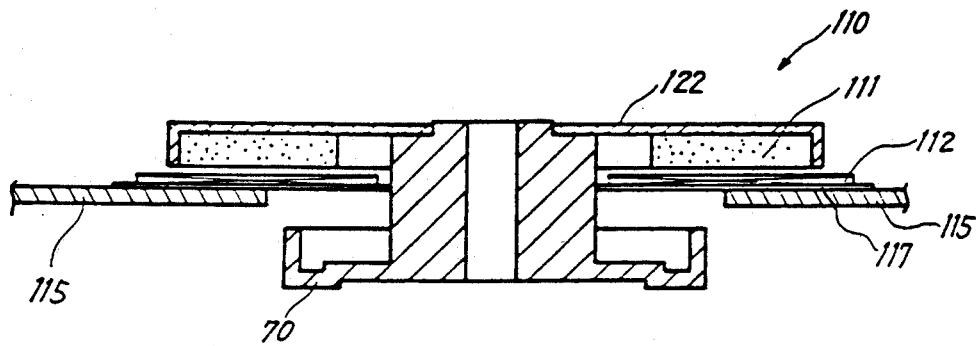
Figure 27:
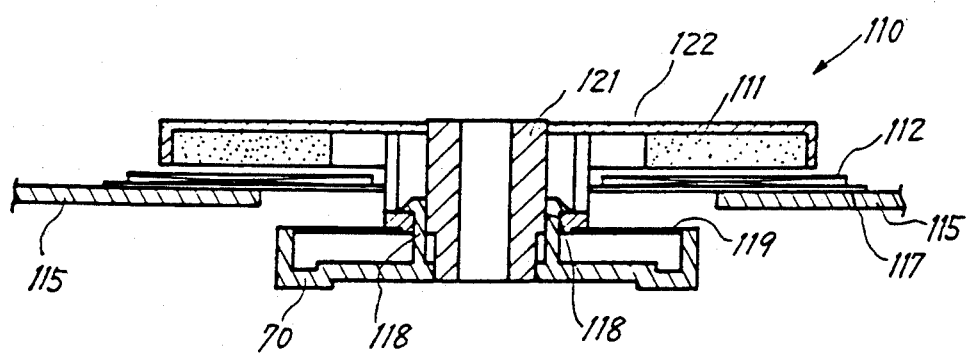

FIGS. 25 to 27 show motor-clamp assemblies 110 embodying the invention.

The motor-clamp assembly 110 shown in FIG. 25 comprises a clamp 70, a magnet 111 attached to the head of the clamp 70 by a back yoke 122 and a coil 112 opposed to the magnet 111 and supported by a nonmagnetic member 115 fixed to the chassis. A rotary yoke 116 constituting a motor along with the back yoke 122, the magnet 111 and the coil 112 is secured to the clamp 70. A thrust bearing 113 is interposed between the head of the clamp 70 and an elastic member 114 fixed to the nonmagnetic member 115.

Accordingly, when the disc 120 on the turntable pushes up the clamp 70 against the elastic member 114 with the rise of the turntable 50, the resiliency of the elastic member 114 produces a clamping force. When the coil 112 is energized in this state, the rotary yoke 116 is drivingly rotated along with the clamp 70. Even if the raised position of the clamp 70 differs for different kinds of discs in this case, the distance between the magnet 111 and the rotary yoke 116 remains unchanged, with the result that the rotational torque of the motor is maintained at a constant value.

With the motor-clamp assembly 110 shown in FIG. 26, a stator yoke 117 is fixedly provided on a nonmagnetic member 115, and a coil 112 is disposed on the stator yoke 117. A magnet 111 supported by a back yoke 122 on a clamp 70 is opposed to the coil 112. In this case, the magnetic attraction between the magnet and the stator yoke 117 constituting a motor gives a clamping force.

The motor-clamp assembly 110 shown in FIG. 27 comprises a clamp 70 having a plurality of engaging pieces 118 projecting therefrom, a shaft 121 in engagement with the pieces 118 vertically movably and nonrotatable relative thereto, and a magnet 111 attached to the upper end of the shaft 121 by a back yoke 122. The clamp 70 is connected to the shaft 121 also by an elastic member 119. Accordingly, even if the raised position of the clamp 70 differs owing to variations in the thickness of discs, the difference in the position is absorbed by the elastic member 119 to provide an approximately constant gap between the magnet 111 and the coil 112. Consequently, the disc clamping force, as well as the rotational torque of the motor, is maintained at a specified value.

When the motor-clamp assembly 110 described above is installed, the turntable 50 is the sole portion which is movable upward and downward relative to the chassis 13 and which can therefore be of further reduced weight and size.

The foregoing embodiments are given for illustrative purposes only and should not be construed as limiting the invention defined in the appended claims or as reducing the scope of the invention. Further the components of the player of the invention are not limited in construction to those of the embodiments but can of course be modified variously by one skilled in the art.

What is claimed is:

1. A disc player having a turntable drivable by a spindle motor, a tray drive mechanism for driving a tray from a disc discharge position to a loading completed position above the turntable, a disc clamp mechanism for pressing a disc on the tray into contact with the turntable, and a pickup assembly for recording signals on and reproducing signals from the disc on the turntable, wherein the tray drive mechanism, the disc clamp mechanism and the pickup assembly are provided on a fixed chassis, the tray drive mechanism, the disc clamp mechanism, and the pickup assembly are associated with a drive gear mechanism, and driven through employment of a single loading motor as a drive source, the spindle motor is coupled to a motor lift mechanism and drivable upward and downward relative to the chassis, the turntable is movable upward from a standby position below the tray in the loading completed position through a central opening of the tray to a disc clamping completed position where the disc can be pressed into contact with a clamp of the disc clamp mechanism, the drive gear mechanism is fixed on the fixed chassis, and the drive gear mechanism has a plurality of output portions coupled to the tray drive mechanism, the motor lift mechanism, and the pickup assembly, respectively, and a power transmission changeover mechanism is provided to the drive gear mechanism for transmitting the power of the loading motor selectively to one of the tray drive mechanism, the disc clamp mechanism, and the pickup assembly, wherein the pickup assembly comprises a slide base disposed on the chassis reciprocatingly movably along a radial line of the turntable and reciprocatingly drivable between a first position opposed to the innermost peripheral portion of the disc to be clamped on the turntable and a second position opposed to or further outward of the outermost peripheral portion of the disc, and a pickup supported on the slide base upwardly and downwardly movable and drivable upward and downward between a retracted position below the path of reciprocating movement of the tray and a raised position close to the tray for recording or reproducing signals, the pickup being settable in the retracted position where the tray is being loaded.

2. A disc player having a turntable drivable by a spindle motor, a tray drive mechanism for driving a tray from a disc discharge position to a loading completed position above the turntable, a disc clamp mechanism for pressing a disc on the tray into contact with the turntable, and a pickup assembly for recording signals on and reproducing signals from the disc on the turntable, wherein the tray drive mechanism, the disc clamp mechanism and the pickup assembly are provided on a fixed chassis, the tray drive mechanism, the disc clamp mechanism, and the pickup assembly are associated with a drive gear mechanism, and driven through employment of a single loading motor as a drive source, the spindle motor is coupled to a motor lift mechanism and drivable upward and downward relative to the chassis, the turntable is movable upward from a standby position below the tray in the loading completed position through a central opening of the tray to a disc clamping completed position where the disc can be pressed into contact with a clamp of the disc clamp mechanism, the drive gear mechanism is fixed on the fixed chassis, and the drive gear mechanism has a plurality of output portions coupled to the tray drive mechanism, the motor lift mechanism, and the pickup assembly, respectively, and a power transmission changeover mechanism is provided to the drive gear mechanism for transmitting the power of the loading motor selectively to one of the tray drive mechanism, the disc clamp mechanism, and the pickup assembly, wherein the pickup assembly is provided with a pickup transport mechanism for reciprocatingly driving a pickup, and the drive gear mechanism drivable by the single loading motor is provided on the fixed chassis, the drive gear mechanism having a plurality of output portions coupled at least to the pickup transport mechanism and the motor lift mechanism respectively, and an intermediate gear for driving the motor lift mechanism, the intermediate gear being coupled to the motor lift mechanism by a cam mechanism, the cam mechanism comprising a cam groove formed spirally in the gear, and a drive lever pivotably supported on the chassis, the cam groove having a drive cam portion gradually decreasing in radius and a cam portion of small definite radius, the drive lever being provided at a free end thereof with a cam follower engaged in the cam groove and having another free end coupled to the motor lift mechanism, a side pressure relief mechanism being provided on the chassis and engageable with the drive lever during the transport of the pickup for releasing the cam follower of the drive lever from pressing contact with the cam portion of small radius.

3. A disc player having a turntable drivable by a spindle motor, a tray drive mechanism for driving a tray from a disc discharge position to a loading completed position above the turntable, a disc clamp mechanism for pressing a disc on the tray into contact with the turntable, and a pickup assembly for recording signals on and reproducing signals from the disc on the turntable, wherein the tray drive mechanism, the disc clamp mechanism and the pickup assembly are provided on the fixed chassis, the tray drive mechanism, the disc clamp mechanism, and the pickup assembly are associated with a drive gear mechanism, and driven through employment of a single loading motor as a drive source, the spindle motor is coupled to a motor lift mechanism and drivable upward and downward relative to the chassis, the turntable is movable upward from a standby position below the tray in the loading completed position through a central opening of the tray to a disc clamping completed position where the disc can be pressed into contact with a clamp of the disc clamp mechanism, the drive gear mechanism is fixed on the fixed chassis, and the drive gear mechanism has a plurality of output portions coupled to the tray drive mechanism, the motor lift mechanism, and the pickup assembly, respectively, and a power transmission changeover mechanism is provided to the drive gear mechanism for transmitting the power of the loading motor selectively to one of the tray drive mechanism, the disc clamp mechanism, and the pickup assembly, wherein the motor lift mechanism comprises a motor base supported upwardly and downwardly movable relative to the fixed chassis and having the spindle motor attached thereto, two slide drive plates arranged on opposite sides of the motor base and guidable for a horizontal reciprocating movement along the chassis, a cam mechanism comprising a plurality of pins projecting from each of opposite side faces of the motor base and engaged respectively in a plurality of cam grooves formed in the slide drive plate obliquely with respect to the direction of horizontal movement thereof, a drive member reciprocatingly drivable by power from the loading motor in the direction of movement of the slide drive plates, and a spring provided between the drive member and the slide drive plates.

* * * * *